(12) United States Patent
Vijayendran et al.

(10) Patent No.: US 8,106,148 B2
(45) Date of Patent: Jan. 31, 2012

(54) RESINS, LOW TEMPERATURE FORMULATIONS, AND COATINGS DERIVED THEREFROM

(75) Inventors: Bhima R. Vijayendran, Dublin, OH (US); Jerry L. King, II, Crawfordsville, IN (US); Katherine P. Mitchell, Pickerington, OH (US); Michael C. Clingerman, Hilliard, OH (US); Jeffrey T. Cafmeyer, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 838 days.

(21) Appl. No.: 11/908,688

(22) PCT Filed: Mar. 20, 2006

(86) PCT No.: PCT/US2006/010135
§ 371 (c)(1),
(2), (4) Date: Jul. 15, 2008

(87) PCT Pub. No.: WO2006/102279
PCT Pub. Date: Sep. 28, 2006

(65) Prior Publication Data
US 2009/0105377 A1    Apr. 23, 2009

Related U.S. Application Data

(60) Provisional application No. 60/663,422, filed on Mar. 18, 2005, provisional application No. 60/758,757, filed on Jan. 13, 2006.

(51) Int. Cl.
*C08G 18/10*     (2006.01)
*C08G 63/78*     (2006.01)
*C09D 177/08*    (2006.01)
*C09D 175/04*    (2006.01)

(52) U.S. Cl. .................. 528/295.5; 528/295.3; 528/300; 528/301; 528/302; 528/303; 528/304; 528/305; 528/307; 528/308.6; 528/308.7

(58) Field of Classification Search .............. 528/295.3, 528/295.5, 300, 301, 302, 303, 304, 305, 528/307, 308.6, 308.7
See application file for complete search history.

(56) References Cited

U.S. PATENT DOCUMENTS

| 5,036,134 A | 7/1991 | Kunz et al. |
| 2002/0115817 A1* | 8/2002 | Hayes ................. 528/295.3 |

FOREIGN PATENT DOCUMENTS

| WO | 9403545 A1 | 2/1994 |
| WO | 9719138 A1 | 5/1997 |
| WO | 03082944 A1 | 10/2003 |

OTHER PUBLICATIONS

Wittcoff, H. A. et al., Industrial Organic Chemicals, 2nd Ed., 2004, ISBN 0-471-44385-9, pp. 421-423.
European Search Report for Application No. 10186993.1-2102, Battelle Memorial Institute, dated Jan. 21, 2011.
European Search Report for Application No. 10187003.8-2102, Battelle Memorial Institute, dated Jan. 17, 2011.

* cited by examiner

*Primary Examiner* — Ana Woodward
(74) *Attorney, Agent, or Firm* — MacMillan, Sobanski & Todd, LLC

(57) ABSTRACT

A series of resins were synthesized using a range of bio-based materials to control the molecular architecture, and therefore the properties, of the inventive resins. The utility of these resins was demonstrated in the formulation of powder coatings, such as β-hydroxy amide crosslinked and hybrid types. Generally, the bio-based resins flowed out on heating faster than conventional petrochemically-based resins, allowing the use of lower temperatures in the curing oven than is typically possible and a more active catalyst system, especially in the carboxylic acid-epoxy crosslinked hybrid coatings formulations.

9 Claims, 8 Drawing Sheets

RESINS, LOW TEMPERATURE FORMULATIONS, AND COATINGS DERIVED THEREFROM This application claims the benefits of Provisional Application No. 60/663,422 filed Mar. 18, 2005; and Provisional Application No. 60/758,757 filed Jan. 13, 2006.

The entire contents of the two provisional applications are incorporated by reference herein.

FIELD OF THE INVENTION

The invention is useful for producing powder coatings for substrates particularly temperature sensitive substrates. Typical temperature sensitive substrates include organic substrates including but not limited to polymers such as plastics, and composites including but not limited to wood and plastic composites.

BACKGROUND OF THE INVENTION

Current powder coating resins and formulations have one serious limitation: They generally need fairly high oven temperature (typically above 177° C. to have the good flow and cross-linking required for acceptable performance. Many of the substrates to be coated—such as plastics, wood and bio-composites—are quite temperature sensitive and cannot tolerate the high temperatures used in current powder coatings formulations. The use of such substrates has seen a significant increase in the last several years and is expected to grow quite dramatically in the future. See the Muthiah reference for an example of recent work in the area of low temperature cure powder coatings.

There is a need for a durable, cost-effective low temperature thermally cured powder coatings for temperature-sensitive substrates that also can be used on high temperature substrates such as metals. In such cases, lower temperature would lead to lower energy cost in the process. Lower costs should significantly increase the acceptance of the new technology.

There is a great deal of interest in the replacement of some petrochemical feedstocks with bio-based feedstocks for use in a wide range of application areas. Evidence of this interest is reflected in the number of review articles that have been published through the years. Efforts to utilize bio-based feedstock in the synthesis of polyester resins is exemplified in U.S. Pat. No. 6,063,464 and in the paper by Guo, et. al. (see below), wherein corn bio-mass derived isosorbide is used in the synthesis of polyester materials.

There is also a need to produce powder coatings that flow-out and cure at lower temperatures than those currently used in the industry. Powder coatings offer environmental advantages in that they are very low in in-use emissions of VOCs. Unfortunately, some of that advantage is lost due to high energy demands in the cure cycle and the rough finishes typically derived from them owing to poor flow-out at low temperatures.

Other related patents and journal articles include;
LOW TEMPERATURE CURE: U.S. Pat. No. 6,703,070 March 2004 Muthiah
SYNTHESIS AND PROCESSING: EP1491593 December 2004 Mons
BIO-BASED MATERIALS REVIEWS: Applied Microbiology and Biotechnology (2001), 55(4), 387-394. Huttermann, A.; Mai, C.; Kharazipour, A. "Modification of lignin for the production of new compounded materials";
Biopolymers from Renewable Resources (1998), 1-29. Kaplan, David L. "Introduction to biopolymers from renewable resources";
Bioresource Technology (1994), 49(1), 1-6. Sharma, D. K.; Tiwari, M.; Behera, B. K. "Review of integrated processes to get value-added chemicals and fuels from petrocrops"; and
Applied Biochemistry and Biotechnology (1988), 17 7-22. Narayan, Ramani. "Preparation of bio-based polymers for materials applications".
BIO-BASED RESIN SYNTHESIS: Abstracts of Papers, 224th ACS National Meeting, Boston, Mass., United States, Aug. 18-22, 2002 (2002). Guo, Yinzhong; Mannari, Vijaykumar M.; Massingill, John L., Jr. "Hyperbranched bio-based polyols".
POWDER COATINGS: "Powder Coatings Volume 1: The Technology, Formulation, and Application of Powder Coatings". Howell, David M. John Wiley and Sons, London, 2000.
Polymer Preprints 2003, 44(1). Gedan-Smolka, Michaela; Lehmann, Dieter; Lehmann, Frank. "Catalysis in Uretdione Powder Coatings Enables Innovative Processing Lines".

In addition to the need for low temperature flow and cure in powder coatings, there is also a need for good dispersion of pigments within a coating matrix, regardless of the coating type. To accomplish this, polymers are designed that have components with differing compatibilities. Polymeric dispersants stabilize pigments and other ingredients in paints, coatings, and ink systems via, most typically, steric stabilization. Polymeric dispersants have a two-component structure comprised of anchoring groups and polymeric chains. Most typically the anchoring groups are polar materials that interact with the particle surfaces and the polymeric chains which are compatible with the continuous phase of the coating. In effect, the polymeric groups form a coating around the particles, preventing them from making contact and agglomerating into larger, incompatible aggregates.

There are many anchoring group/polymer configurations that might be expected to give effective polymeric dispersants. The inventive resin has polar carboxylic anchoring sites and non-polar vegetable oil chains and can therefore act as a dispersant as well as a binder. A curing binder that can also act as a dispersant could eliminate the need for separate additives for dispersing many pigments. Related art includes U.S. Pat. Nos. 5,959,066; 6,025,061; 6,063,464; and 6,107,447.

BRIEF DESCRIPTION OF THE INVENTION

Briefly, there is a need for a durable, cost-effective low temperature thermally cured powder coating for temperature-sensitive substrates that also can be used on high temperature substrates such as metals. There is a further need to find replacement materials for petrochemical feedstocks, especially when abundant bio-based feedstocks can be utilized in this replacement. The bio-based powder coatings technology disclosed herein meets this need by combining novel resin derived from renewable bio-source and proprietary formulation technologies, especially low temperature cure technologies. In the latter cases, lower temperature would lead to lower energy cost in the process, and should significantly increase the acceptance of the new bio-based technology.

One embodiment of the invention provides for the synthesis of polyester resins that have a Tg greater than 50° C., a bio-based content of at least 5% and in another at least 50%, and relatively low viscosity.

In broad embodiments, the resins are utilized in the formulation of coatings, especially powder coatings.

In a further embodiment the resin includes carboxylic functional polyesters from the reaction on diacids and diols.

In a further embodiment the acids and diols utilized to form the polyester resins are bio-based or petroleum based as needed in order to maximize the properties of the resultant coatings and to maximize the amount of bio-based material in the resins.

In yet further embodiments of the invention, the resins are compounded with crosslinking resins for curing into protective coating films with good flow and flexibility, often at relatively low temperatures.

In yet further embodiments of the invention, the resins are compounded with PRIMID resins for curing into protective coating films with good flow and flexibility.

In yet further embodiments of the invention, the resins are compounded with acrylic epoxy resins for curing into hybrid powder coating films with good flow and flexibility, at relatively low temperatures.

In a further embodiment the formulations include catalysts, flow control agents, cure modifying additives and the like to control appearance, cure rate, and other properties.

In a further embodiment the formulations include catalysts comprised of imidazole and substituted imidazoles.

In a further embodiment the formulations include cure modifying additives such as acidic additives to modify the activity of the imidazole and substituted imidazole catalysts.

In further embodiment the formulations may contain additives and excipients known in the art including pigments for color, appearance, corrosion control, hiding, or other functions.

DETAILED DESCRIPTION OF THE INVENTION AND BEST MODE

Figure 1:
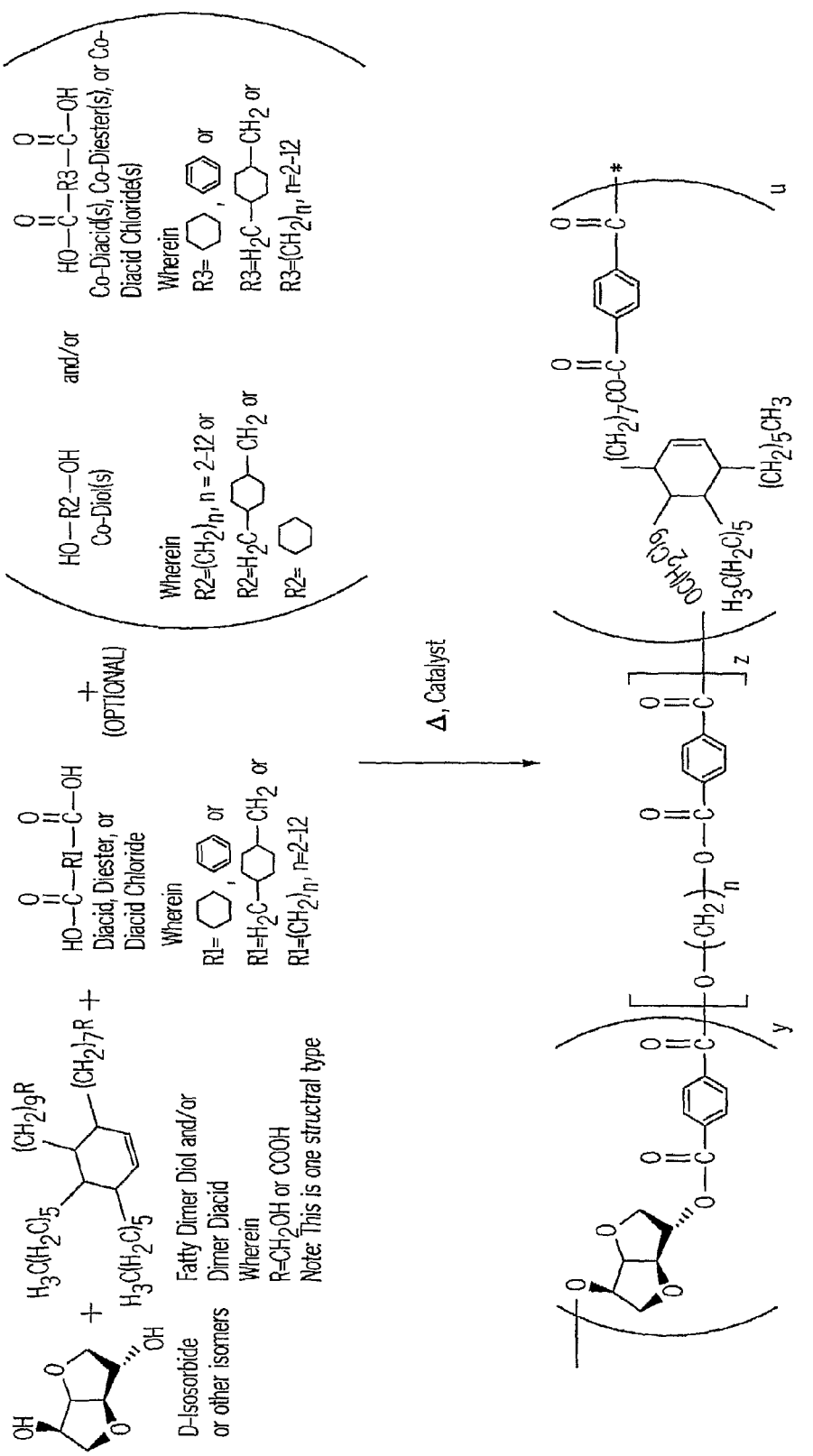
FIG. 1 is a schematic flowchart that shows a synthetic pathway toward polyester materials blending hard, crystalline isosorbide with amorphous dimer diols, aromatic diesters and other ingredients.

Broadly the invention combines the desired use of bio-based feedstock with the need for lower temperature powder coatings. Corn and soy feedstocks can be utilized to make resins with a balance of properties appropriate to powder coating performance. These resins can then be formulated into a variety of powder coating formulations.

Typically, a powder coating formulation according to the invention is prepared by: Pulverizing the principal resin, dry blending with a pulverized hardener and selected pulverized additives, melt-mixing the dry blend, extruding the melt-mixed blend, followed by rapid cooling. The cooled blend is then pulverized to a desired particle size, and finally the resulting powder is classified into the final particle size.

Bio-based feedstocks, formulations, products, materials, resins and the like, as used herein for some embodiments of the invention, means feedstocks, formulations, materials, resin, and products and the like that are derived at least in part from conversion of agricultural and forest based renewable resources processed by conventional chemical modifications and/or by biological processes such as fermentation. The carbon source is derived from a renewable plant crop/tree resource unlike conventional fossil derived carbon source that is finite and is depleting.

Hybrid resins as used herein means that the resin is a blend of more than one type of resin, for example polyester and epoxy.

A resin that is particularly useful according to the present invention has a good balance of two apparently contradictory properties:

(1) A low viscosity at melt for good flow-out on application, which is characteristic of amorphous resins, but must also have, (2) A relatively high glass transition temperature ($T_g$) for good storage stability, characteristic of crystalline resins. If the Tg is too low, the powder particles will be "soft" and will coalesce into an unusable mass on storage, especially at elevated storage temperatures. Typically, these properties are balanced by blending crystalline and amorphous resins into effectively semi-crystalline resin blends. Typically resins obtained according to the present invention provide these desired properties.

Note: Unless otherwise specified % when referring to the amount of an ingredient refers to weight percent (wt %).

There are four general approaches for resin synthesis disclosed herein:

1. Hydroxyl functional polyesters based upon dimer diols, isosorbide-derived diols and/or dimer acids. Typically the carboxyl or hydroxyl functionality of the polyester is determined by the ratio of the molar excess of either the diacid or the diol groups. The polyesters typically have a net bio-based content of at least about 5 wt %, but most typically about 20 to about 50 wt %

2. Carboxyl functional polyesters based upon dimer diols, isosorbide-derived diols and/or dimer acids. Typically the carboxyl or hydroxyl functionality of the polyester is determined by the ratio of the molar excess of either the diacid or the diol groups. The polyesters typically have a net bio-based content of at least about 5 wt %, but most typically about 50 to about 70 wt %

3. Hydroxyl, carboxyl, or isocyanate functional polyurethanes based upon dimer acids and/or dimer diols. Typically excess isosorbide and/or dimer diol produces hydroxyl functionality and excess dimer acid produces carboxyl functionality, and excess polyisocyanate produces isocyanate functionality. The polyurethanes typically have a net bio-based content of at least about 5 wt %, but most typically about 20 to about 50 wt %.

4. Amido-amine functional resins as disclosed in WO 2004/077169, for Readily Deinkable Toners, filed Feb. 2, 2004, and designating the United States. The amido-amine resins are a reaction product of dimer acid and diamine as described in the patent application the contents of which are incorporated by reference herein. In some embodiments of the present invention typical amido amine functional resins have a Tg of less than about 80° C. In other embodiments of the present invention the amido-amines have a Tg of less than about 70° C. The net bio-based content is typically at least 5 wt %, but more typically at about 40 to about 60 wt %

Figure 3:
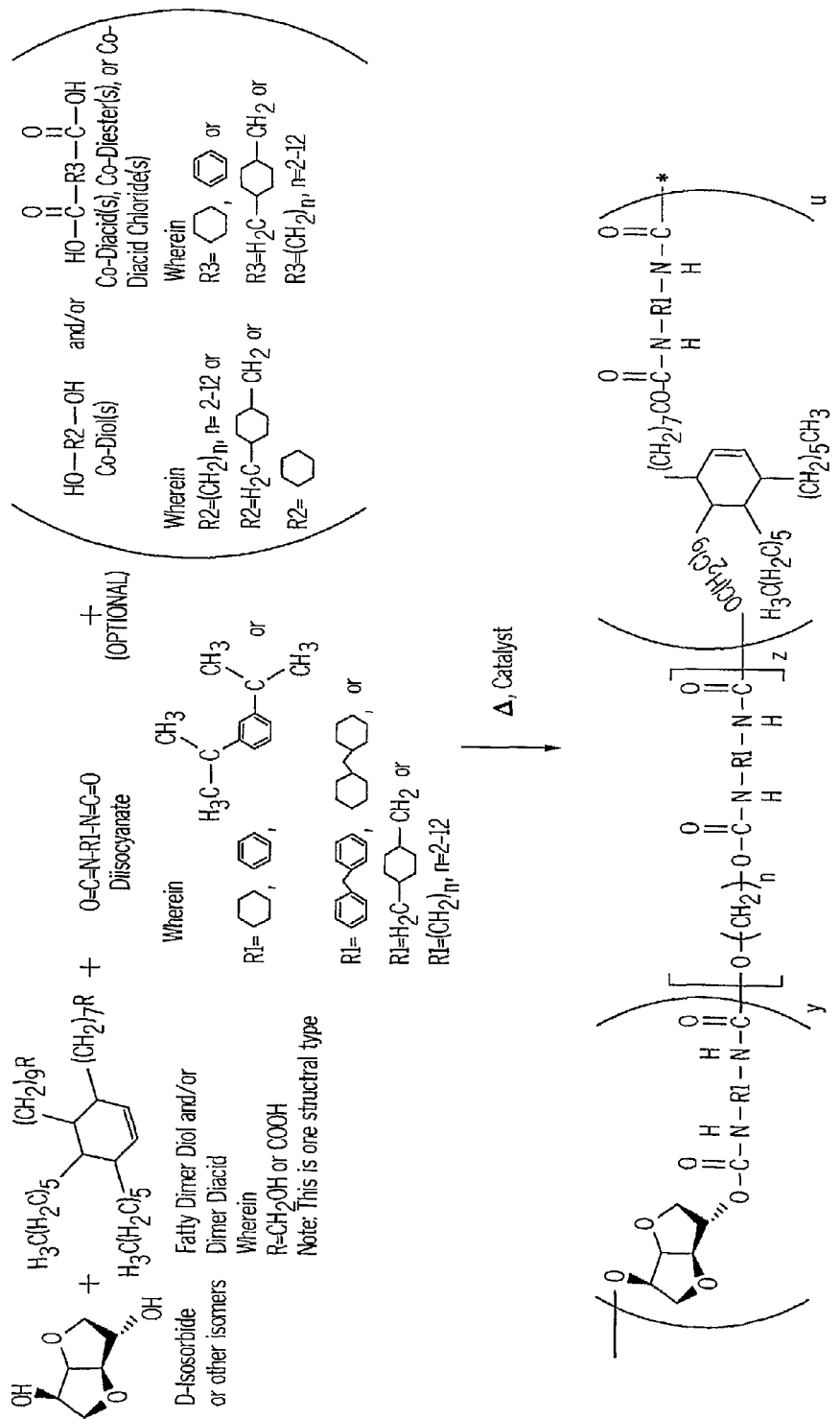
FIG. 3 is a schematic flow chart that shows a synthetic pathway toward polyurethanes blending hard, crystalline isosorbide with dimer diol, amorphous dimer diacids, polyisocyanates (e.g. diisocyanate), and other ingredients.

Resins according to the invention can be comprised of co-reacted components that tend to contribute rigidifying effects, such as isosorbide (typically from corn feedstock), and components that contribute flexiblizing effects, such as dimer acid or dimer diol (typically from vegetable oil feedstocks). By appropriately co-reacting these components into resins both the flow-out and storage stability of the resin can be controlled. In general, rigidifying components contain functional chemical groups, such as alcohol, ester, carboxylic acid or acid chloride, attached to a cyclic structure which limits their mobility whereas the flexiblizing components contain functional chemical groups attached to aliphatic carbon chains. Isosorbide is a diol comprised of fused cyclic ether rings and is a member of a larger family of bio-based sugar derivatives commonly referred to as dianhydrohexitols. Dimer acid and dimer diol are di-carboxylic acids and di-alcohols, respectively, derived from bio-based fatty acids which are largely aliphatic in nature. Similarly these rigidifying and flexiblizing effects may also apply to polyurethanes as depicted in FIG. 3.

The resins are typically cured by crosslinking with a catalyst and/or heat. Typical cure temperatures are up to 125° C.

The polyester polyol resins disclosed herein are useful in coatings, adhesives, sealants and other applications in reactive formulations with isocyanates, epoxies, melamine formaldehydes, urea formaldehydes and others.

Poly carboxylic resins disclosed herein are useful in coatings, adhesives, sealants and other applications in reactive formulations with β-hydroxyl amides, epoxies, and others.

Amido-amine functional resins are useful in coatings, adhesives, sealants and other applications in reactive formulations with isocyanates, epoxies, melamine formaldehydes, urea formaldehydes and others.

Of particular usefulness are the disclosed bio-derived resins in powder coating formulations. Example 4 describes a bio-derived carboxylic functional resin cured in a transesterification manner with a β-hydroxyl amide in a powder coating formulation to form a clear coating. Example 4A describes a resin similar to that in Example 4, however the resin has been made in a larger scale. The obtained resin has a slightly higher Tg. Example 5 describes a bio-derived carboxylic functional resin cured with an acrylic epoxy resin in a powder coating formulation to form a clear coating. Example 6 describes a bio-derived carboxylic functional resin cured with a commercial epoxy crosslinking resin in a pigmented powder coating formulation to form a black colored coating. Example 6A describes pigment dispersions comprised of a bioderived carboxylic acid functional resin and carbon black as compared to a commercial carboxylic functional resin and carbon black and their effect on color when added to a white powder coating formulation. Example 6B describes a bio-based carboxylic acid functional resin cured with triglycidyl isocyanurate (TGIC) crosslinker.

Example 7 describes a bio-derived amido-amine functional resin cured with a commercial epoxy crosslinking resin in a powder coating formulation to form a clear coating.

Example 8 illustrates the production of a powder coating using a bio-based polyester as a flow promoter. The polyester resin is described in Example 3B.

Example 9, the final example, illustrates pigment dispersion properties of a resin prepared according to Example 3F.

One embodiment of the present invention concerns a process for the manufacture of resins for powder coating application from a minimum to a maximum amount of bio-based materials. The resins in another embodiment of the invention include at least one saturated or unsaturated bio-based polyester.

The present invention also pertains to the use of one or more of these bio-based materials in a variety of applications including, but not limited to coatings, powder coatings, adhesives, toners, inks, sealants, polymer additives, and others. Resins for one embodiment were designed that would have a glass transition temperature ($T_g$) of less than about 80° C., other embodiments having a glass transition temperature of less than about 70° C., yet further embodiments of less than about 60° C., with appropriate melt rheology. A resin according to a broad general embodiment of the invention has a minimum glass transition temperature of at least about 20° C. and a maximum of about 80° C., with appropriate melt rheology. Resins useful for flow control typically are at the lower end of the glass transition temperature range (e.g. Example 3B where the Tg is about 28.4° C.), however they can range from about 20° C. to about 80° C., and on some embodiments can typically be about 25° C. to about 60° C.

Hybrid powder coatings resins comprised of inventive resins containing greater than 50% bio-based and carboxy functional groups were formulated into powder coatings. The inventive resins described herein are comprised of co-reacted components that tend to be hard and highly functional, such as isosorbide (typically from corn feedstock), and components that tend to be soft and flexible, such as dimer acids (typically from soybean feedstock). By appropriately co-reacting these components into resins both the flow-out and storage stability can be controlled.

The present invention also concerns the formulation of a powder coating from the one or more inventive resins. A distinguishing characteristic of this powder coating is the ability of this coating to flow-out and cure into a continuous film at temperatures lower than typical for powder coating operations. The low temperature curing capability derives from the low-viscosity nature of the bio-based resin utilized in its composition and a formulation that exploits the advantageous flow characteristics of the inventive resinous component. The advantage obtained from the inventive resin is the low viscosity at a given temperature when compared to an approximately equivalent commercial resin.

A key characteristic of resins used in powder coatings formulations is the glass transition temperature ($T_g$) which is typically at least about 50° C. and preferable at least about 60° C. for storage stability of the ultimate powder coating powder. Table 1 shows a list of several soy-based resins, their functionality, and their $T_g$. This Table illustrates the difficulty of producing a resin with an acceptable $T_g$ from materials that include low-viscosity soy-based monomers.

TABLE 1

Soy-based resins

| Resin No. | Functionality | Tg (° C.) (if available) |
|---|---|---|
| R-1 | Amido-amine | 61 |
| R-2 | Hydroxyl | 45 |
| R-3 | Hydroxyl | 28 |
| R-4 | 100% Hydrogenated Polyester polyol | Waxy |
| R-5 | 50% Hydrogenated Polyester polyol | Waxy |
| R-6 | Polyester | Waxy |

Only Resin 1-1 met the criteria for $T_g$. To achieve higher $T_g$s in the presence of soy-based materials and maintain a high loading of bio-based material in the resins, isosorbide, another bio-based material, but one with high inherent $T_g$ contribution was utilized.

A higher $T_g$, bio-based material (isosorbide, derived from corn feedstock) was identified that could be co-reacted with the soy-based materials to give resins with a high bio-based content and a sufficiently high $T_g$ for powder coating formulations. Subsequent syntheses sought to balance the soy, the isosorbide and other ingredients to achieve an appropriate balance of properties in the resins and, ultimately, in the powder coatings.

Resin Synthesis (See Examples 1 and 2):

The use of bio-based materials in the production of coatings can be described as follows:

A polyester polymer is prepared by (1) mixing in a reactor isosorbide (derived from corn feedstock); fatty dimer diol and/or dimer diacid (derived from soybean feedstock); a diacid, diester, or diacid chloride; optional co-diol(s); and optional co-diacid(s), co-diester(s) or co-diacid chloride(s), with a condensation catalyst suitable for polymerizing aromatic diacids and diols; and (2) heating the monomers and catalyst to polymerize the monomers to yield a polyester. (See FIG. 1)

A carboxyl functional polyester resin is prepared by (1) mixing in a reactor isosorbide; fatty dimer diacid; optional co-diacid(s), co-diester(s) or co-diacid chloride(s); and optional co-diol(s); with a condensation catalyst; and (2) heating the monomers and catalyst to polymerize the monomers to yield a carboxyl functional polyester resin. (See FIG. 2)

A hydroxyl, carboxyl, or isocyanate functional polyurethane is prepared by (1) mixing in a reactor isosorbide; fatty dimer diacid and/or dimer diol; a polyisocyanate; optional co-diol(s); and optional co-diacid(s), co-diester(s), or co-diacid chloride(s), with or without a catalyst suitable for polymerizing diols and diacids with polyisocyanates; and (2) heating the monomers and optional catalyst to polymerize the monomers to yield a polyurethane. (See FIG. 3)

Figure 2:
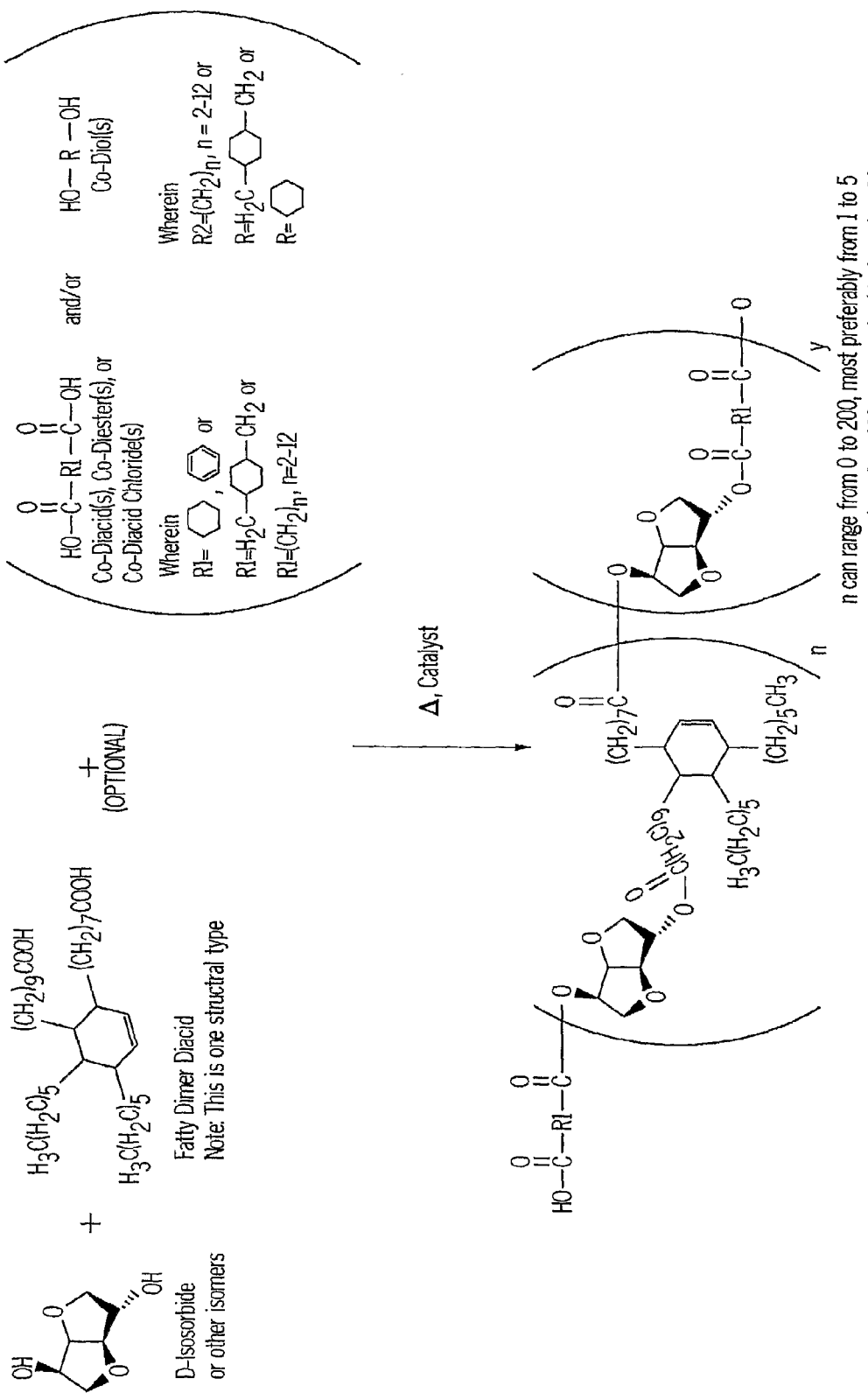
FIG. 2 is a schematic flowchart that shows a synthetic pathway toward polyester acids blending hard, crystalline isosorbide with amorphous dimer diacids and other ingredients. These can be utilized specifically in hybrid powder coatings formulations to crosslink epoxy functional sites.

Referring now to FIGS. 1, 2, and 3 that disclose various reactants useful for the embodiments herein. In addition to the disclosed dimer diols and dimer acids the invention according to a broad embodiment includes aliphatic chains typically having from about 4 to about 20 carbon atoms. More preferably, the aliphatic chains have about 6 to about 16 carbon atoms.

The additional disclosed dimer diols and dimer acids include a six member ring with two side chains being an aliphatic side chain of about 4 to 20 carbon atoms and the other two side chains of about 8 to 12 carbon atoms with an alcohol or carboxylic functional group.

Additionally, the diesters, diacids, co-diacids and co-diesters may have the formula $R_2$—CO—$R_1$—CO—$R_2$ wherein $R_2$=—OH, —$OR_3$, or —Cl, wherein $R_3$=an aliphatic chain having from one to four carbon atoms. $R_1$ is an aromatic or an aliphatic group having 2-12 carbon atoms.

Although not wishing to be bound by theory, it is presently believed that the aliphatic side chains in the dimer acid and dimer diol provide a low viscosity property for the resins. The aliphatic side chains tend to soften at low temperatures causing lowered viscosity and better flow. The longer the chain the more softening will be seen and the faster it will soften on heating.

They are also believed to provide in some embodiments improved pigment dispersion as illustrated in Example 9. One consequence of better flow is superior wetting of pigment, thereby improving pigment dispersion.

Additionally and more broadly, dihanhydrohexitols can be use din the invention. Thus other dianhydrohexitols can replace D-isosorbide or its isomers in preparing rigidifying structures by means of incorporating bicyclic containing other cyclic diols can be used in the invention. Diols incorporating cyclohexyl, isophorone, and other cyclic structures can add the rigidifying effect similar to isosorbide.

Dimer diacids are typically viscous liquids produced by the dimerization of $C_{18}$ unsaturated fatty acids. There are three biosources of $C_{18}$ unsaturated fatty acids; vegetable, tall oil, and animal. The $C_{18}$ units can be linked together in several ways. Four main structural types are known for the predominant component, the $C_{36}$ diacids; acyclic, monocyclic, bicyclic, and aromatic. There are also many structural isomers for each of these structural types. The distribution of these structural types and isomers is dependent on the mono/poly-unsaturation ratio of the starting fatty acid feedstock and the process conditions employed for dimerization. The smallest dimer diacid typically used in some embodiments is a $C_{18}$ diacid.

Four types of dimer diacids are currently commercially available; (1) standard (undistilled), which contain about 80% $C_{36}$ dibasic acids, (2) distilled, in which the $C_{36}$ dibasic acid content has been enhanced to 92-98%, (3) distilled and partially hydrogenated for improved color, and (4) distilled and fully hydrogenated for maximum stability.

Typical dimer acids used to prepare the bio-based polyester resins were Empol 1018® (Examples 3, 3C, and 3E) and Pripol 1013® (Examples 2, 3A, and 3D), both vegetable-based dimer acids. Empol 1018® is manufactured by Cognis Corporation and Pripol 1013® is manufactured by Uniqema. Cognis has since discontinued their vegetable-based dimer acid production in favor of tall oil-based dimer acid. Table 3 compares the physical properties and composition of Pripol 1013® and Empol 1018®. Pripol 1013® is lighter in color and has a higher dibasic acid content. The resultant carboxyl functional resins using the two different dimer acids had similar physical properties.

TABLE 1A

Dimer Acid Compositions and Properties

| Dimer Acid | Empol ® 1018 (Batch # U42G151910) | Pripol ® 1013 (Batch # 091687) |
|---|---|---|
| Acid Value | 193.5 | 195 |
| Color, Gardner | 8 | 3-4 |

TABLE 1A-continued

Dimer Acid Compositions and Properties

| Dimer Acid | Empol ® 1018 (Batch # U42G151910) | Pripol ® 1013 (Batch # 091687) |
|---|---|---|
| Composition | | |
| wt % Monobasic Acid | 5 | 0.1 |
| wt % Dibasic Acid | 81 | 97 |
| wt % Polybasic Acid | 14 | 3 |

Dimer diol is typically produced by high-pressure hydrogenation of dimer diacid methyl ester. The dimer diol used to prepare the bio-based polyester resins (Example 1, 1A, and 3B) was SPEZIOL C36/2 1075® dimer diol. This is a vegetable-based dimer diol produced by Cognis.

The resins disclosed herein have low viscosity relative to commercial petrochemically-based resins once melted (see examples). In current commercial resin powder coating formulations, it is necessary to add flowable materials (flow control additives) in order to get good flow-out and leveling of the resultant film after the cure cycle. The bio-based resins require little or no such additives to achieve good film leveling and appearance. The bio-based resins can also function as flow additives themselves in formulations containing conventional petrochemically-based resins in which they were successfully incorporated. Typically, a bio-based resin content of about 0.1 wt % to about 5 wt % is used for the purpose of utilizing the flow control properties of the inventive resins in conjunction with using other main powder resins for coating formulations.

The inventive polyester polymers were prepared by melt polymerization of isosorbide, dimer diol and/or dimer acid, a diacid, diester, or diacid chloride; optional co-diol(s); and optional Co-diacid(s), co-diester(s) or co-diacid chloride(s) (Method from FIG. 1)

A typical procedure used to prepare the inventive polyesters is described in Example 1. Aliphatic polyesters are soft, flexible rubbery materials. Most aromatic polyesters are crystalline. Blending the soft dimer diols with the highly functional isosorbide and with the crystalline aromatic di-acids results in a good balance of properties. This balance can be helped, however, by including other materials, such as ethylene glycol in the reaction (i.e., as the "diol" in FIGS. 1 and 2).

The effect of various monomers was studied by preparing polyesters with glass transition temperatures ($T_g$s) ranging from 61° C. to 165° C. (Tables 2A and 2B). Table 2A shows typical properties of resins synthesized as described herein and the effects of various monomers that with glass transition temperatures ($T_g$s) ranging from 61° C. to 165° C. Table 2B shows typical properties of carboxyl functional resins synthesized as described in examples 2-3A.

TABLE 2A

Polyester polyols based on soy-derived dimer diol and/or corn-derived isosorbide

| EXAMPLE | Dimer Diol (mole %)[a] | Isosorbide (mole %) | Ethylene Glycol (mole %) | Dimethyl-terephthalate (mole %) | $T_g$ (° C.) | Inherent Viscosity (dl/g)[b] | Hydroxyl Value (mg KOH/g) | Acid Value (mg KOH/g) |
|---|---|---|---|---|---|---|---|---|
| Example 1 | 5.8 | 14.9 | 27.8 | 51.5 | 61 | 0.29[c] | 23.3 | 8.0 |
| Example 1A | 12.2 | 38.0 | 0 | 49.8 | 165 | 0.10 | 40.9 | 2.6 |
| Example 3B | 10.8 | 17.1 | 22.7 | 49.4 | 28.4 | 0.19 | 35.4 | 6.1 |

Notes

[a]Dimer diol based polyester resin % compositions were calculated based upon the NMR of the final resin and are in mole %

[b]Measured on a 1% (weight/volume) solution of the polymer in o-chlorophenol at a temperature of 25° C.

[c]Only 92% soluble in o-chlorophenol.

ND = not determined

TABLE 2B

Polyester carboxylic acids based on soy-derived dimer acid and corn-derived isosorbide

| Example # | Dimer Acid (wt %)[a] | Isosorbide (wt %) | 1,4-CHDA (wt %) | $T_g$ (° C.) | Inherent Viscosity (dl/g)[b] | Hydroxyl Value (mg KOH/g) | Acid Value (mg KOH/g) |
|---|---|---|---|---|---|---|---|
| Example 2 | 19.4 | 37.1 | 43.4 | 64.2 | ND | ND | 34.8 |
| Example 3 | 16.1 | 38.4 | 45.5 | 66.9 | 0.25 | 13.0 | 36.3 |
| Example 3A | 18.8 | 37.6 | 43.6 | 65.3 | ND | ND | 29.0 |

Notes

[a]Dimer acid based polyester resin composition calculations were based upon initial charge weights

[b]Measured on a 1% (weight/volume) solution of the polymer in o-chlorophenol at a temperature of 25° C.

ND = not determined

The data shows the large range of $T_g$s possible with these monomers. A test polyester prepared without isosorbide was not amorphous like those containing isosorbide but was crystalline in behavior.

Figure 3A:
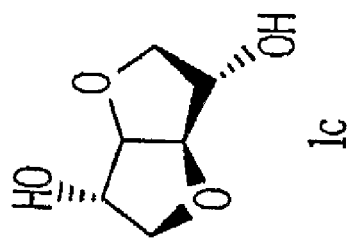
FIG. 3A illustrates typical isomers of isosorbide—1a, 1b, and 1c that are useful with the invention.
Figure 3A:
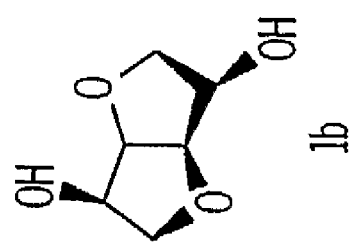
Figure 3A:
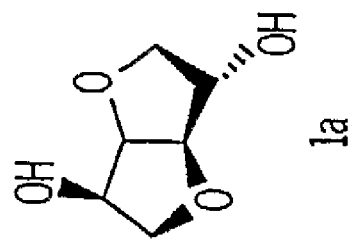

D-Isosorbide (1,4:3,6-dianhydro-D-glucitol) (1a) or isomers thereof and/or mixtures of all isomers, including D-Isosorbide, could be used in place of D-Isosorbide. 1,4:3,6-dianhydro-D-mannitol (1b) and 1,4:3,6-dianhydro-D-iditol (1c) are two isomers of Isosorbide. D-isosorbide was used in this invention but isomers of D-isosorbide are expected to work as well. Isomers of isosorbide useful with the invention are illustrated in FIG. 3A.

Examples of suitable polyols for forming the acid-functional polyester include: 1,2-ethanediol (ethylene glycol), 1,3-propanediol, 1,4-butanediol, 1,6-hexanediol, 1,10-decanediol, 1,12-dodecanediol, 1,4-cyclohexanedimethanol, diethylene glycol, triethylene glycol, neopentyl glycol, trimethylolpropane, hydrogenated bisphenol A (2,2-(dicyclohexanol)propane), 2,2,4-trimethyl-1,3-pentanediol, 2-methyl-1,3-propanediol, 2-methyl-2-hydroxymethyl-1,3-propanediol, 2-ethyl-2-hydroxymethyl-1,3-propanediol and the like, and combinations comprising at least one of the foregoing polyols. Since the current work targets maximizing bio-based content, the preferred polyols are isosorbide (from corn stock) and dimer acid diol (from soybean stock), ethylene glycol and others may be used to enhance properties as needed.

Suitable polycarboxylic acids, acid esters and acid chlorides include those derived from succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid, naphthalene dicarboxylic acid, dimer acids, and the like, and combinations comprising at least one of the foregoing polycarboxylic acids. The preferred diester is the dimethyl ester of terephthallic acid. Dodecanedioic acid (DDA) is used as a modifier in several formulations. Presently preferred are diacids such as 1,4-cyclohexanedicarboxylic acid, Empol 1018®, Pripol 1013®, and the like.

To obtain carboxyl-functional polyesters of desired molecular weight, the monomer mixture used to form the polyester typically has an appropriate excess of carboxyl functionality to hydroxyl functionality where the ratio of hydroxyl equivalents over acid equivalents is typically 0.85-0.95. The polyesters may range from amorphous to crystalline.

Crosslinking is achieved by reacting the carboxyl group of the carboxy functionality with either a β-hydroxyl amide in a self catalyzed trans-esterification reaction (often referred to as the PRIMID reaction after the amide's trade name (Table 3) or with a commercial polyepoxy functional polymer. Preferred polyepoxy compounds, especially for low temperature cure compositions, are epoxy-functional acrylic or methacrylic resins such as glycidyl acrylate or glycidyl methacrylate copolymer (collectively, "GMA") resins. GMA resins are typically obtained from about 5 to about 30 wt % of glycidyl acrylate or glycidyl methacrylate and about 80 to about 95 wt % of methyl methacrylate, wherein up to about 50 wt % of the methyl methacrylate can be replaced by another alpha, beta-unsaturated monomer, e.g., styrene, acrylonitrile, and the like. Suitable GMA resins have epoxy equivalent weights of about 200 to about 1000, preferably about 200 to about 600, and an Mn of 200 to about 2000 atomic mass units (AMU) as determined by gel permeation chromatography. They are solid at room temperature, having melting points above about 40° C., preferably a softening point of about 50° C. to about 75° C., and a Tg of about 40° C. to about 60° C. (Table 3).

Given that low temperature flow-out can be achieved with the bio-based resinous components, it is advantageous to utilize a catalyst that initiates cure at a temperature of from about 115° C. to about 140° C., selectable from the many that are commercially available. Typically, a catalyst may be used at a level of from about 0.1 to about 5 parts per hundred parts of the resin (phr), preferably about 0.2-2 phr to accelerate the curing reaction with the low temperature curing agent. Preferred catalysts for this invention are imidazoles and adducts thereof, the imidazoles having the general formula shown in Formula 1:

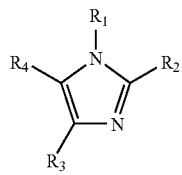

FORMULA I wherein $R_1$, $R_2$, $R_3$, and $R_4$ are independently hydrogen, methyl, phenyl, or benzyl.

Broadly, the substituent may be any not reactive with the epoxy resin. Tertiary amines and poly-amine materials are also useful as catalysts for this reaction.

To maintain good flowability, it may be necessary to modify the reactivity of the imidazole catalyst by creating an adduct that partly blocks its reactivity. Sometimes this is accomplished by making an adduct of the imidazole with epoxies (see, for example U.S. Pat. No. 6,703,070). In one embodiment of the present invention, the parent imidazole was the catalyst of choice and acidic materials were added to the formulation to mitigate the reactivity of the imidazole.

Acidic materials that are suitable for mitigating the reactivity of the imidazole include aromatic sulfonates, such as benzene or naphthalene sulfonic acids and substituted variations thereof, aromatic carboxylates, such as or naphthalene carboxylic acids and substituted variations thereof, solid acidic materials, such as inorganics or super-acids, may also be employed. In the latter cases, a portion of the imidazole catalyst may be adsorbed onto the solid acidic surface and therefore made unavailable to the bulk of the binder until heated. One such solid material, for example, is the blocked superacid NACURE® 7231 (an ammonium antimonate) from King Industries.

The coating powder may also contain a flow control agent in the range of from about 0 to about 5 wt % with the range from about 0.1 wt % to about 2 wt % being most preferred. Examples of the flow control agents include the MODAFLOW® poly(alkylacrylate) (i.e., MODAFLOW 6000®) products and others such as the SURFYNOL® acetylenic diols (i.e., P200®) which contain hydroxyl, carboxyl or other functional groups. The functionalized flow additives also aid intercoat adhesion in the event that touch-up or repair of the powder coating is necessary. The flow additives may be used singly or in combination. Anti-oxidants may also be used at a concentration of from about 0.5 to about 2.0 phr to prevent the discoloration of the coatings even at the relatively low curing temperatures suitable for the purposes of this invention. As mentioned elsewhere herein the inventive resin itself may act as a flow control agent as exemplified by Example 3B resin in formulation Example 8.

Pigments such as titanium dioxide and/or carbon black, fillers such as calcium carbonate, texturizing agents such as particulate rubber, bentonite clays, powdered polytetrafluoroethylene (PTFE) with or without polyethylene powders, such as those sold under the trademark LANCOWAX®, and other conventional additives may also be present for appearance and to reduce cost.

Benzoin is typically used as an anti pin-holing additive (see the Howell reference).

Table 3 shows a list of commercial powder coating resins describing their functionality and their $T_g$. Some of these resins were used in the preparation of the examples herein. The remainder have been used in other formulations and are also useful with the various embodiments of the invention.

TABLE 3

Commercial resins for formulation studies

| Resin | Functionality | $T_g$ (° C.) |
|---|---|---|
| FINE-CLAD ® M-8930 (Reichhold) | COOH polyester | 65 |
| FINE-CLAD ® A-257 (Reichhold) | GMA acrylic epoxy, dispersant | 50 |
| FINE-CLAD ® A-253 (Reichhold) | GMA acrylic epoxy | 50 |
| FINE-CLAD ® A-249-A (Reichhold) | GMA acrylic epoxy | 64 |
| FINE-CLAD ® A-241 (Reichhold) | Flow promoter | 66 |
| RUCOTE ® 102 (Bayer) | Polyester polyol | 55 |
| PRIMID ® XL 552 (PRIMID EMS ®) | β-Hydroxy amide | 120 (melt point) |
| PRIPOL ® 1013 (Unichema) | Dimer acid | Oil |
| Dodecanedioic acid (DDA) (various) | aliphatic diacid | 127-129 (melt) |

A general procedure that can be adapted to prepare the powder coating formulations according to the invention is described below:

Procedure: Powder Coating Mix Protocol: A Brabender® mixer is typically used, however, the procedure can be adapted for other types of mixers.

- Calculate powder coating formulation to equal approximately 70 to 80 g based on a 120 ml bowl size. A typical small Sigma Blade bowl holds 70 g unpigmented to low Pigment to Binder (P/B) coating formulation, or 80 g of a higher P/B paint.
- Preheat a Brabender® mixer or similiar mixer to 99° C. by starting oil heater. Allow 30 minutes to preheat.
- When preheating is complete, start rotors and test security of the bowl to the instrument.
- Turn on the torque sensor. This will act as a guide for how the mix is proceeding.
- Add approximately 30 g of primary resin slowly to the bowl.
- Allow the resin to mix and melt until the torque sensor shows a steady value (about 5 minutes) then add any remaining primary resin slowly to mixing bowl and allow mixing and melting.
- Add any/all additives to center of the mix zone between rotors.
- Allow to mix until the torque value is stable (typically about 10 minutes).
- Slowly add all of the crosslinking resin to the bowl. Allow to mix at least 3 minutes, make sure the torque reading remains stable in case crosslinking starts (torque reading will start to rise rapidly).
- Add catalyst (if called for) last, watching the torque reading closely. The torque should increase and the batch should be stopped after a 10% rise in viscosity (torque).
- The product is quickly removed from the mixing bowl as a thick molten material and is cooled to the desired temperature (typically room temperature) till it is hard (it is typically a hard brittle shiny material).
- After cooling to the desired temperature, the product is broken into small chips.
- The chips are then ball milled or otherwise micronized (e.g. ball mill paint chips in presence of 10 mm-15 mm steel media for 16 hours) to obtain a fine powder.
- The powder is sieved through appropriate screens to remove any large pieces, typically pieces larger than about 105 microns.

Utilizing the methods described, several classes of powder coatings formulations can be prepared.

A general procedure for producing the finished powder coatings according to the invention is as follows.

- The substrates are prepared for coating by wiping clean with a solvent appropriate for the substrate (e.g. water, methyl ethyl ketone, isopropyl alcohol).
- The substrates are grounded.
- The powder coating is poured into the sample reservoir of a powder spray gun—such as the Versa-Spray® supplied by Nordson Corporation.
- The voltage controls are adjusted on the spray gun control unit to ensure the appropriate charge is applied to the powder.
- The powder is applied via standard powder coating techniques to achieve the desired film thickness of approximately 50.8-76.2 microns (2-3 mils) dry film thickness.
- The substrate is then placed in an oven for the appropriate time and temperature.

Typically β-hydroxy amide based powder coatings are based upon transesterification crosslinking of a carboxyl functionality with a di-N-β-hydroxylamide crosslinker. These types of powders are exemplified by commercial PRIMID® type powders. Example 4 shows the details of formulation and cure of bio-based resin versus a conventional petrochemical based resin. This type of chemistry is insensitive to catalysis, therefore no significant difference in cure rate was expected, and indeed, no cure speed advantage for either resin was detected in that case.

The two coatings were cured at two different temperatures, 121° C. and 147° C. for 30 minutes. The biggest difference was the gloss at the higher temperature, which was approximately 50 units higher for the bio-based resin formulation than for the control. Solvent resistance was slightly lower for the bio-based formulation, however. Evidently the bio-based resin is performance competitive overall when compared to the commercial control in β-hydroxy amide® crosslinked formulations.

Hybrid Powder Coatings: Carboxylic Acid-Epoxy Crosslinking

Carboxylic acid-epoxy crosslinked powder coatings are the most common of the hybrid coatings. Typically these are comprised of petroleum-derived polyester acids that are formulated with acrylic epoxy crosslinkers. Inventive carboxylic functional bio-based resins were synthesized and tested against the commercial petrochemical-based polyester acids in typical formulations.

FIG. 4A shows the comparative viscosity (in poise) versus shear rate at 121° C. of a bio-based resin from this development versus a typical commercial resin (FINE-CLAD 8400) at 121° C. Note that the bio-based resin (lower set of data points) is lower in viscosity than its counterpart.

Based upon the viscosity difference, it is likely that the bio-based material will provide more flow at lower temperature, enabling an overall improvement in appearance of low temperature cured coatings. The implication of the improvement can be approximately measured using roughness average measurements from various industrial manufacturing methods.

In Example 4A, the surface roughness ($R_a$) for the petrochemical based control clear coat is rated at 4.2, versus the bio-based clear coat rating of 1.3. The roughness of the petroleum derived panel was equivalent to a typical sawing operation while the bio-based panel was equivalent to a typical electron beam or laser operation. The bio-based formulation is much closer to a "Class A" finish than the control.

Comparative panels of the Example 4A bio-based powder coating and a commercially available petroleum-derived low temperature cure powder coating (Forrest Powder Low Temperature Cure®) were made. Both panels were sprayed at approximately 2.5 mils film thickness then thermally cured for 30 minutes at 121° C. The bio-based powder material exhibited considerably less orange peel (or surface roughness) than the comparative powder coating. In addition, the bio-based powder coated panel exhibited a much higher gloss at 60° C. (72 points versus 50 points). See Example 4A for the details of the formulation.

Figure 5:
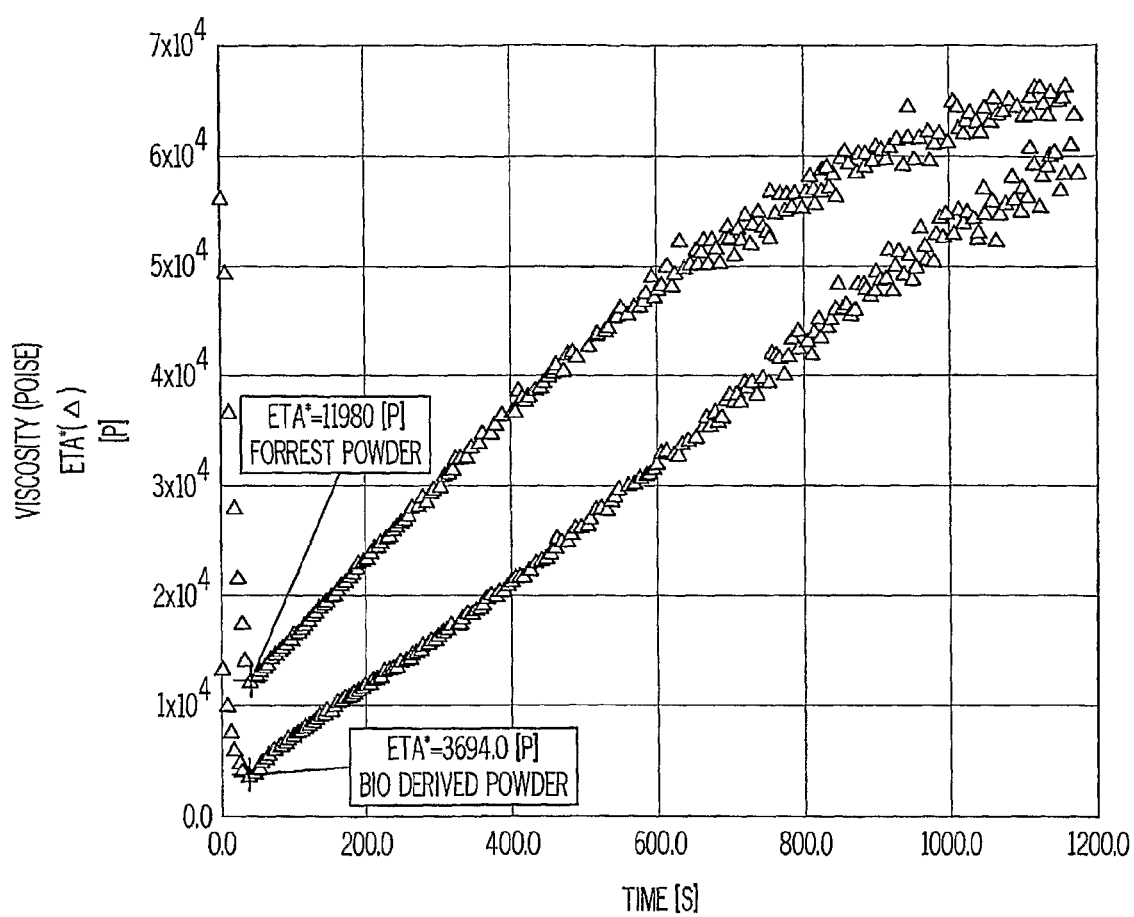
FIG. 5 is a graph illustrating viscosity profiles of a bio-based formulation (Example 4A and a commercial control formulation at about 121° C.

The improved melt flow of the bio derived formulation was measured with a stress-controlled rheometer. The samples of powder were placed between platens heated to 100° C. and compressed to the thickness of a typical powder coating film (about 2 mils). The temperature is increased to 121° C. and the changes in viscosity are measured (in Poise) until the sample cured. The viscosity data is shown in FIG. 5.

The upper curve data points indicate the comparative control powder sample and the lower curve data points indicate the bio-based powder sample. The initial viscosity of the bio-based formulation was significantly lower than the control sample (3694 Poise versus 11980 Poise). As time passes both samples increased in viscosity as the sample cured. Because the viscosity of the bio-based formulation remained lower for the remainder of the cure time, the powder had more of an opportunity to melt and flow out before the film crosslinked and cured.

Flexibility (a measure of toughness) is a key coating attribute which allows the end product to withstand the everyday bumps and dings that come with use of the coated object. Poor flexibility results in cracking of the coating and sometimes delamination from the substrate when an impact occurs. When the substrate is used outdoors, water, ultraviolet radiation, oxidation and chemicals in the atmosphere, such as acid rain, can degrade and embrittle the film. Many of these factors also contribute to corrosion, which leads to rust and poor appearance loss as well as poor flexibility.

The control sample and the bio-based formulation discussed immediately above were compared in a flexibility test called the Mandrel Bend (ASTM D522). For this test, the coated substrates were clamped into a vise and rolled over a conical mandrel. A tape adhesion test over the area determined the final performance of the coating. The tape is applied to the bend area over the coating and is pulled off to determine if the coating is still adhered to the panel.

The conical mandrel had varying widths across its length, down to 3.18 mm (⅛ inch)—the smallest size available for testing and the toughest one to pass without coating delamination or cracking.

The bio-based coating had good flexibility, as only minor cracking and no signs of delamination were evident. The control petroleum derived coating cracked through the length of the panels and the coating delaminated for approximately 40% of the length of the bend. See Example 5 for formulation details.

Pigmented powder coatings may also derive some advantages from the bio-based resin formulations if the low viscosity at temperature is complimented by good wetting of the pigment surfaces. In Example 6, two black formulations, one control and one bio-based are described.

The bio-based powder coating had a much higher gloss at 60° C. than the petrochemical-derived coating (85 points versus 44 points). This was again likely due to the better melt-flow of the formulation during thermal cure.

The color development/jetness of the black pigment was improved with the bio-based formulation. Jetness can be determined by measuring the L and b color components of the coating. (For an explanation of the Hunter Color Scale, see "Organic Coatings: Science and Technology", Second Edition, Wicks, Z. W. et al., especially pages 351-355, Wiley Interscience, NY, N.Y. ISBN 0-471-24507-0 1999).

The overall Delta E, or color difference for the two black panels was 0.52 with the bio-based being the more developed (jet). The control panel (left) appeared greyer than the bio-based formulation because the black pigment was not dispersed as well into the coating system as the bio-based formulation. This is likely due to the low viscosity of the bio-based resin.

Figure 6:
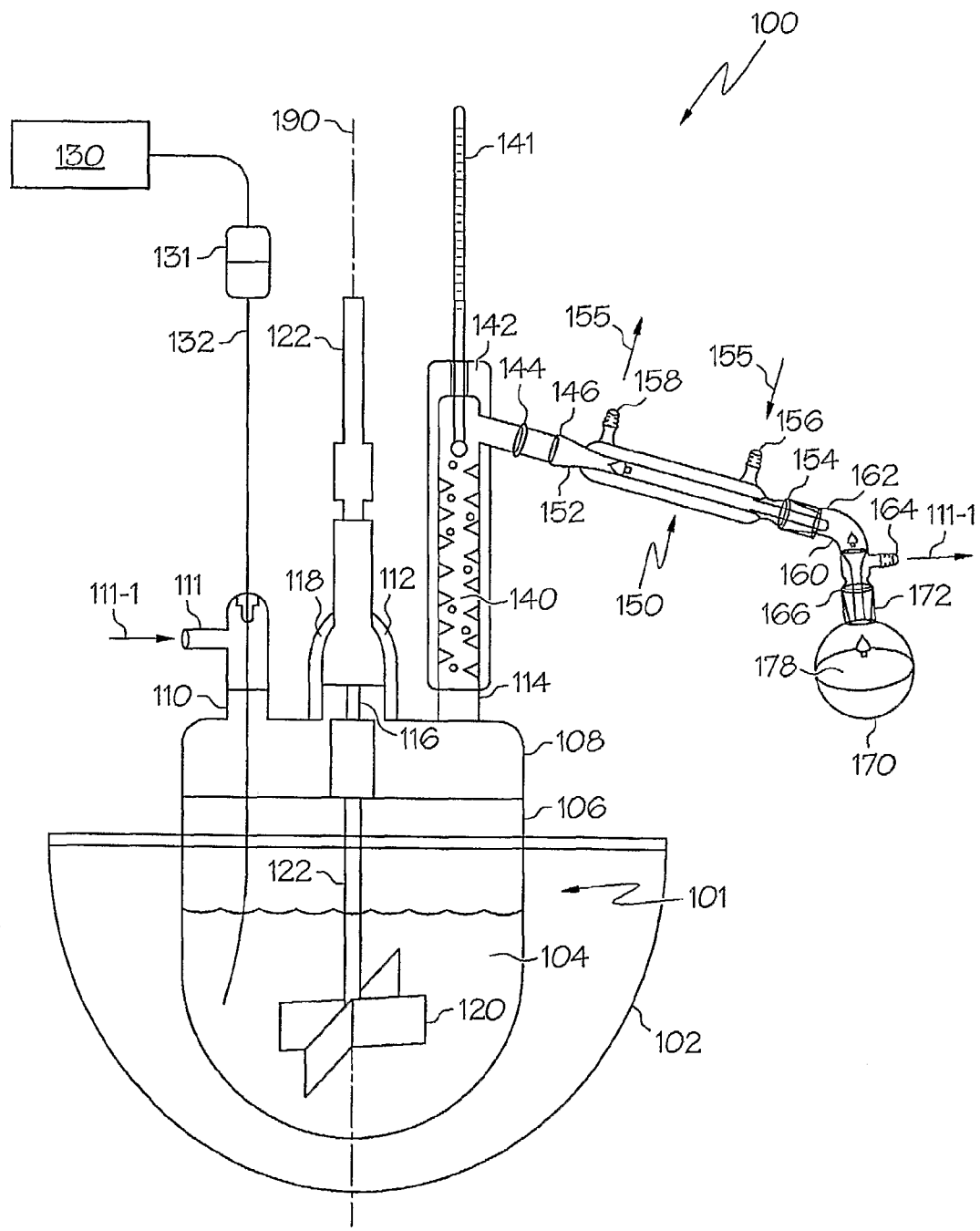
FIG. 6 is a schematic drawing showing the various elements of the apparatus used for making resin examples 1 through 3F.

Referring now to FIG. 6, this figure is a schematic drawing showing the various elements of the apparatus 100 used for making resins according to the invention. A heating mantle 102 surrounds reactor 101 at least in part and is used to control the temperature of reactor 101 containing reaction mixture 104. Reactor 101 consists of a reaction vessel 106 and top 108. Top 108 has multiple necks 110, 112, 114, 116 for connection to various appliances. Stirring is provided by paddle 120 (e.g. typically 45° angle blades) that is at the end of stirshaft 122 (e.g. stainless steel). Stirshaft 122 passes through neck 116. A thermocouple controller 130 connected to thermocouple 132 via connector 131 passes through neck 110 at gas inlet connector 111 in a sealed arrangement into reaction mixture 104. Vigreaux column 140 is mounted on neck 114 in sealed relationship. A thermometer 141 or other temperature measuring device is mounted at the top (distillation head) 142 of the Vigreaux column 140. Condenser 150 is mounted to the Vigreaux column 140 at neck 144 with connector 146 via condenser inlet 152. Vigreaux column 140 may be a separate unit surrounded by a jacket or the jacket and column may be unitary. Condenser outlet 154 is connected at neck inlet 162 of neck 160 that has a gas exit outlet 164, and neck outlet 166. Receiver flask 170 has an inlet 172 connected to neck outlet 166. Cooling liquid 155 enters condenser 150 at inlet 156 and exits at outlet 158.

In operation, argon gas 111-1 enters at gas inlet connector 111 to blanket reaction mixture 104 and flows out at gas exit 164. Ingredients can be added before the apparatus is closed or through sealed connector 118 at neck 112. Note that in FIG. 6, neck 112 is located directly behind neck 116. Neck 112 is located on the central axis 190 of reactor 101. Distillate 178 is collected in receiver flask 170.

The following examples are meant to be illustrative of various aspects of the invention and are not meant to limit the scope of the invention in any way.

Resin Production (Example 1 through Example 3F)

EXAMPLE 1

This example illustrates the production of a hydroxyl functional bio-based polyester resin.
Equipment (see FIG. 6)
1 liter 4-neck cylindrical walled round bottom glass flask, jacketed Vigreaux column, distillation head, gas inlet and exit adapters, stainless steel stir shaft and four blade (45° angle) paddle, condenser, and receiver flask.
Procedure
The reactor was charged with dimethyl terephthalate (DMT) (228.30 g, 1.1757 moles), Speziol C36/2 1075® dimer diol (Batch #415252) (77.61 g, 0.1411 moles), D-isosorbide (123.90 g, 0.84785 moles), and ethylene glycol (EG) (102.81, 1.6563 moles), followed by manganese (II) acetate tetrahydrate (0.0917 g), cobalt (II) acetate tetrahydrate (0.0618 g), and antimony (III) oxide (0.103 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Methanol was continuously collected as the reaction was heated above approximately 150° C. When the temperature drops at the top of the Vigreaux column, this indicates that the methanol has been removed. Approximately 95 ml of methanol was distilled over. Subsequently, a solution of polyphosphoric acid (0.0634 g) in EG (1 g) was added to the reaction mixture. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, ethylene glycol distilled off (91 g), and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.
A resin was produced having the following properties:
Solution inherent viscosity: 0.29 (solvent is o-chlorophenol, only 92% soluble)
$T_g$=61° C.
Hydroxyl Value=24.3
Acid Value=8.0
Molecular Weight (MW)=3470 (Calculated from acid and hydroxyl values)
Polymer Characteristics:
Color: Brown
Tackiness: Non-tacky
Clarity: Slightly translucent
Flexibility: Brittle
Solid

EXAMPLE 1A

This example illustrates the production of a bio-based polyester resin.
Equipment (see FIG. 6)
1 liter 4-neck cylindrical walled round bottom glass flask, jacketed Vigreaux column, distillation head, gas inlet and exit adapters, stainless steel stir shaft and four blade (45° angle) paddle, condenser, and receiver flask.
Procedure
The reactor was charged with dimethyl terephthalate (DMT) (197.74 g, 1.0183 moles), D-isosorbide (119.05 g, 0.81463 moles), and Speziol C36/2 1075® dimer diol (Batch #415252) (112.06 g, 0.20371 moles), followed by 1,2,3,4-tetrahydronaphthalene (2 ml) and antimony (III) oxide (0.089 g). The reactor was blanketed with argon. The temperature of the reactor contents was raised to 200° C. with stirring (after solids melted) under argon. This temperature was maintained for 12 minutes. The reaction mixture was slowly heated to 250° C. over a 20 minute period (2.5° C./min). This temperature was maintained for 8 minutes. Methanol was continuously collected as the reaction was heated above approximately 150° C. When the temperature drops at the top of the Vigreaux column, this indicates that the methanol has been removed. Approximately 83 ml of methanol was distilled over. The argon flow rate over the reaction mixture was checked and when necessary, reduced to a slow rate in order to avoid distilling over isosorbide. The reaction mixture was slowly heated to 280° C. over 13 minute period (2.3° C./min). Then, the reaction mixture was allowed to cool to 260° C. Additional D-isosorbide (14.87 g, 0.1018 moles) was charged to the reaction mixture. The reaction mixture was heated to 280°. This temperature was maintained for 30 minutes. The distillate receiver was replaced with the vacuum receiver and vacuum was gradually applied (≦9 Torr). During this time, a low molecular weight polymer formed. The reaction mixture temperature was maintained at 280° C. for 2 hours and 40 minutes. The reaction was terminated by blanketing the reaction mixture with argon to obtain atmospheric pressure. The reaction mixture was then cooled to ≦250° C. and poured onto a fluorinated fiber glass sheet.
A resin was produced having the following properties:
Solution inherent viscosity: 0.10 (solvent is o-chlorophenol)
$T_g$=165° C.
Hydroxyl Value=45.0
Acid Value=2.3
Molecular Weight (MW)=2372 (Calculated from acid and hydroxyl values)
Polymer Characteristics:
Color: Light Brown
Tackiness: Tacky
Clarity: Translucent
Flexibility: Somewhat Brittle
Solid

EXAMPLE 2

This example illustrates the production of a carboxyl functional bio-based polyester resin.
Equipment (see FIG. 6).
5 liter round bottom glass reaction vessel with 4 neck top, jacketed Vigreaux column, distillation head, gas inlet and exit adapters, stainless steel stir shaft and four blade (45° angle) paddle, condenser, and receiver flask.
Procedure
The reactor was charged with D-isosorbide (1337.0 g, 9.1490 moles) (as received), Pripol 1013° dimer acid (batch

091687) (699.1 g, 1.215 moles), and 1,4-cyclohexanedicarboxylic acid (1,4-CHDA) (1563.8 g, 9.0826 moles) followed by antimony (III) oxide (1.231 g). The reactor was blanketed with argon. Then, 1,2,3,4-tetrahydronaphthalene (2 ml) was added to the reaction mixture under argon. The temperature of the reactor contents was raised to is 200° C. with stirring (after solids melted) under argon. This temperature was maintained for 30 minutes. The reaction mixture was slowly heated to 250° C. over a 47 minute period (1.1° C./min). This temperature was maintained for 3.1 hours or until the temperature dropped at the top of the Vigreaux column to 30° C. or less. Water was continuously collected as the reaction was heated above approximately 180° C. When the temperature drops at the top of the Vigreaux column, this indicates that most of the water has been removed. Approximately 329 ml of water distilled over. The argon flow rate over the reaction mixture was checked and when necessary, reduced to a slow rate in order to avoid distilling over isosorbide. The reaction mixture was slowly heated to 280° C. over a 2 hour period (0.25° C./min). The distillate receiver was replaced with the vacuum receiver and vacuum was gradually applied (<1 Torr). During this time, residual water distilled over, and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced with the following properties:
$T_g$=64.2° C.
Acid Value=34.8
Molecular Weight (MW)
    GPC (polystyrene standard) $M_n$=1689
    GPC (polystyrene standard) $M_w$=11681
    Polydispersity ($M_w/M_n$)=6.91
Polymer Characteristics:
Color: Light Amber
Tackiness: Non-Tacky
Clarity: Translucent
Flexibility: Brittle
Solid

EXAMPLE 3

This example illustrates the production of a carboxyl functional bio-based polyester resin.
Equipment (see FIG. 6).
    1 liter 4-neck cylindrical walled round bottom glass flask, jacketed Vigreaux column, distillation head, gas inlet and exit adapters, stainless steel stir shaft and four blade (45° angle) paddle, condenser, and receiver flask.
Procedure
    The reactor was charged with 1,4-cyclohexanedicarboxylic acid (1,4-CHDA) (204.66 g, 1.1886 moles), Empol 1018® dimer acid (batch #U42G151910) (72.54 g, 0.1251 moles), and D-isosorbide (172.80 g, 1.1824 moles) followed by antimony (III) oxide (0.1594 g) The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Water was continuously collected as the reaction was heated above approximately 180° C. When the temperature drops at the top of the Vigreaux column, this indicates that most of the water has been removed. Approximately 47 ml of water distilled over. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, residual water distilled off and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:
Solution inherent viscosity=0.25 dl/g (solvent is o-chlorophenol):
$T_g$=66.9° C.
Hydroxyl Value=13.0
Acid Value=36.3
Molecular Weight (MW)
    GPC (polystyrene standard) $M_n$=2995
    GPC (polystyrene standard) $M_w$=9560
    Polydispersity ($M_w/M_n$)=3.19
Polymer Characteristics:
Color: Light Brown
Tackiness: Non-tacky
Clarity: Mostly Translucent
Flexibility: Brittle but hard.
Solid

EXAMPLE 3A

This example illustrates the production of a carboxyl functional bio-based polyester resin.
Equipment (see FIG. 6)
    5 liter round bottom glass reaction vessel with 4 neck top, jacketed Vigreaux column, distillation head, gas inlet and exit adapters, stainless steel stir shaft and four blade (45° angle) paddle, condenser, and receiver flask.
Procedure
    The reactor was charged with 1,4-cyclohexanedicarboxylic acid (1,4-CHDA) (1570.3 g, 9.1202 moles), Pripol 1013® dimer acid (batch #091687) (675.7 g, 1.174 moles), D-isosorbide (as received) (1354.0 g, 9.2648 moles), followed by antimony (III) oxide (1.247 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 51 minute period (1.0° C./min). This temperature was maintained for 3.1 hours or until the temperature dropped at the top of the Vigreaux column to 30° C. or less. Water was continuously collected as the reaction was heated above approximately 180° C. When the temperature drops at the top of the Vigreaux column, this indicates that most of the water has been removed. Approximately 334 ml of water was distilled over. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, residual water distilled off, and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.
A resin was produced with the following properties:
$T_g$=65.3
Acid Value=29.0
Molecular Weight (MW)
　　GPC (polystyrene standard) $M_n$=2162
　　GPC (polystyrene standard) $M_w$=11872
　　Polydispersity $(M_w/M_n)$=5.49
Polymer Characteristics:
Color: Yellow/Light Amber
Tackiness: Non-Tacky
Clarity: Translucent
Flexibility: Brittle
Solid

EXAMPLE 3B

This example illustrates the production of a hydroxyl functional bio-based polyester resin.
Equipment (see FIG. 6)
1 liter 4-neck cylindrical walled round bottom glass flask, jacketed Vigreaux column, distillation head, gas inlet and exit adapters, stainless steel stir shaft and four blade (45° angle) paddle, condenser, and receiver flask.
Procedure
The reactor was charged with dimethyl terephthalate (DMT) (228.30 g, 1.1757 moles), Speziol C36/2 1075® dimer diol (Batch #415252) (129.40 g, 0.23523 moles), D-isosorbide (123.90 g, 0.84785 moles), and ethylene glycol (EG) (89.66 g, 1.444 moles), followed by manganese (II) acetate tetrahydrate (0.0917 g), cobalt (II) acetate tetrahydrate (0.0618 g), and antimony (III) oxide (0.103 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Methanol was continuously collected as the reaction was heated above approximately 150° C. When the temperature drops at the top of the Vigreaux column, this indicates that the methanol has been removed. Approximately 95 ml of methanol was distilled over. Subsequently, a solution of polyphosphoric acid (0.0634 g) in EG (1 g) was added to the reaction mixture. The argon flow rate over the reaction mixture was checked and when necessary, reduced to a slow rate in order to avoid distilling over isosorbide. The reaction mixture was slowly heated to 280° C. over a 30 minute period (1° C./min). The distillate receiver was replaced with the vacuum receiver and vacuum was gradually applied (<1 Torr). During this time, ethylene glycol distilled off (84 g), and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.

A resin was produced having the following properties:
Solution inherent viscosity: 0.19 (solvent is o-chlorophenol)
$T_g$=28.4° C.
Hydroxyl Value=35.4
Acid Value=6.1
Molecular Weight (MW)=2700 (Calculated from acid and hydroxyl values)
Polymer Characteristics:
Color: Brown
Tackiness: Non-tacky
Clarity: Mostly translucent
Flexibility: Brittle
Solid

EXAMPLE 3C

This example illustrates the production of a hydroxyl functional bio-based polyester resin.
Equipment (see FIG. 6)
1 liter 4-neck cylindrical walled round bottom glass flask, jacketed Vigreaux column, distillation head, gas inlet and exit adapters, stainless steel stir shaft and four blade (45° angle) paddle, condenser, and receiver flask.
Procedure
The reactor was charged with dimethyl terephthalate (DMT) (213.96 g, 1.1018 moles), Empol 1018® dimer acid (Batch #U42G151910) (71.02 g, 0.1225 moles), D-isosorbide (128.79 g, 0.88128 moles), and ethylene glycol (EG) (116.28 g, 1.8734 moles), followed by manganese (II) acetate tetrahydrate (0.0859 g), cobalt (II) acetate tetrahydrate (0.0579 g), and antimony (III) oxide (0.0965 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 30 minutes or until the temperature dropped at the top of the Vigreaux column to 30° C. or less. Methanol was continuously collected as the reaction was heated above approximately 150° C. When the temperature drops at the top of the Vigreaux column, this indicates that the methanol/water mixture has been removed. Approximately 93 ml of methanol/water mixture was distilled over. Subsequently, a solution of polyphosphoric acid (0.0594 g) in EG (1 g) was added to the reaction mixture. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, ethylene glycol distilled off (95 g), and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.
A resin was produced having the following properties:
Solution inherent viscosity: 0.23 (solvent is o-chlorophenol)
$T_g$=58.8° C.
Hydroxyl Value=23.7
Acid Value=1.4
Molecular Weight (MW)=4470 (Calculated from acid and hydroxyl values)
Polymer Characteristics:

Color: Light Brown
Tackiness: Non-tacky
Clarity: Somewhat translucent, slight haze
Flexibility: Brittle
Solid

EXAMPLE 3D

This example illustrates the production of a carboxyl functional bio-based polyester resin.
Equipment (see FIG. 6)
2 liter 4-neck cylindrical walled round bottom glass reaction vessel, jacketed Vigreaux column, distillation head, gas inlet and exit adapters, stainless steel stir shaft and four blade (45° angle) paddle, condenser, and receiver flask.
Procedure
The reactor was charged with 1,4-cyclohexanedicarboxylic acid (1,4-CHDA) (610.68 g, 3.5468 moles), Pripol 1013® dimer acid (batch #091687) (262.78 g, 0.45670 moles), D-isosorbide (re-crystallized with acetone) (526.54 g, 3.6030 moles), followed by antimony (III) oxide (0.4849 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 2.1 hours. Water was continuously collected as the reaction was heated above approximately 180° C. When the temperature drops at the top of the Vigreaux column, this indicates that most of the water has been removed. Approximately 129 ml of water was distilled over. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, residual water distilled off, and a low molecular weight polymer formed. The reaction mixture temperature was maintained at 280° C. for 3 hours and 10 minutes. The reaction was terminated by blanketing the reaction mixture with argon to obtain atmospheric pressure.
The reaction mixture was then cooled to ≦250° C. and poured onto a fluorinated fiber glass sheet.
A resin was produced with the following properties:
$T_g$=62.3
Acid Value=34.7
Molecular Weight (MW)
  GPC (polystyrene standard) $M_n$=3517
  GPC (polystyrene standard) $M_w$=12753
  Polydispersity ($M_w/M_n$)=3.63
Polymer Characteristics:
Color: Amber/Orange
Tackiness: Non-Tacky
Clarity: Translucent
Flexibility: Brittle
Solid

EXAMPLE 3E

This example illustrates the production of a carboxyl functional bio-based polyester resin.
Equipment (see FIG. 6).
1 liter 4-neck cylindrical walled round bottom glass flask, jacketed Vigreaux column, distillation head, gas inlet and exit adapters, stainless steel stir shaft and four blade (45° angle) paddle, condenser, and receiver flask.
Procedure
The reactor was charged with 1,4-cyclohexanedicarboxylic acid (1,4-CHDA) (318.36 g, 1.8490 moles), Empol 1018® dimer acid (batch #U42G151910) (112.84 g, 0.1946 moles), and D-isosorbide (268.80 g, 1.8393 moles) followed by antimony (III) oxide (0.2479 g) The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 2.3 hours. Water was continuously collected as the reaction was heated above approximately 180° C. When the temperature drops at the top of the Vigreaux column, this indicates that most of the water has been removed. Approximately 74 ml of water distilled over. The argon flow rate over the reaction mixture was checked and when necessary, reduced to a slow rate in order to avoid distilling over isosorbide. The reaction mixture was slowly heated to 280° C. over 2 hour period (0.25° C./min). The distillate receiver was replaced with the vacuum receiver and vacuum was gradually applied (<1 Torr). During this time, residual water distilled off and a low molecular weight polymer formed. The reaction mixture temperature was maintained at 280° C. for 3 hours and 10 minutes. The reaction was terminated by blanketing the reaction mixture with argon to obtain atmospheric pressure. The reaction mixture was then cooled to ≦250° C. and poured onto a fluorinated fiber glass sheet.
A resin was produced having the following properties:
Solution inherent viscosity=0.24 dl/g (solvent is o-chlorophenol):
$T_g$=72.3° C.
Hydroxyl Value=0.0
Acid Value=32.8
Molecular Weight (MW)
  GPC (polystyrene standard) $M_n$=4027
  GPC (polystyrene standard) $M_w$=15756
  Polydispersity (Mw/Mn)=3.91
Polymer Characteristics:
Color: Yellow-Brown
Tackiness: Non-tacky
Clarity: Mostly Translucent
Flexibility: Brittle
Solid The following examples 4 through 8 illustrate several typical powder formulations and finished coatings according to the invention.

EXAMPLE 3F

Pigment Dispersion Agent

This example illustrates the production of a carboxyl functional bio-based polyester resin having improved dispersant properties when used in the presence of a pigment.
Equipment (see FIG. 6).
2 liter round bottom glass reaction vessel with 4 neck top, jacketed Vigreaux column, distillation head, gas inlet and exit adapters, stainless steel stir shaft and four blade (45° angle) paddle, condenser, and receiver flask.
Procedure
The reactor was charged with D-isosorbide (545.35 g, 3.7317 moles) (as received), Pripol 1013® dimer acid (batch

091687) (272.17 g, 0.47302 moles), and 1,4-cyclohexanedicarboxylic acid (1,4-CHDA) (632.49 g, 3.6734 moles) followed by antimony (III) oxide (0.498 g). The reactor was blanketed with argon. Then, 1,2,3,4-tetrahydronaphthalene (2 ml) was added to the reaction mixture under argon. The temperature of the reactor contents was raised to 200° C. with stirring (after solids melted) under argon. This temperature was maintained for 30 minutes. The reaction mixture was slowly heated to 250° C. over a 30 minute period (1.6° C./min). This temperature was maintained for 2.1 hours. Water was continuously collected as the reaction was heated above approximately 180° C. When the temperature drops at the top of the Vigreaux column, this indicates that most of the water has been removed. Approximately 134 ml of water distilled over. The argon flow rate over the reaction mixture was checked and when necessary, reduced to a slow rate in order to avoid distilling over isosorbide. The reaction mixture was slowly heated to 280° C. over a two hour period (0.25° C./min). The distillate receiver was replaced with the vacuum receiver and vacuum was gradually applied (<1 Torr). During this time, residual water distilled over, and a low molecular weight polymer formed. The reaction mixture temperature was maintained at 280° C. for 30 minutes. The reaction was terminated by blanketing the reaction mixture with argon to obtain atmospheric pressure. The reaction mixture was then cooled to ≦250° C. and poured onto a fluorinated fiber glass sheet.

A resin was produced with the following properties:
$T_g$=52.9° C.
Acid Value=47.7
Viscosity at 120° C.=7772 Poise
Viscosity at 160° C.=247 Poise
Polymer Characteristics:
Color: Yellow/Light Amber
Tackiness: Non-Tacky
Clarity: Translucent
Flexibility: Brittle
Solid

EXAMPLE 4

This example illustrates the preparation of a powder coating formulation using carboxyl functional resins polyester resins from Example 3 with β-hydroxy amide type crosslinking. The powder formulation is then applied to a substrate.

The carboxyl functional polyester (product of Example 3) was compared to a commercial polyester in a side-by-side comparison of a typical powder coating formulation compounded as described above and crosslinked by β-hydroxy amide transesterification. Table 4 below shows these formulations as a weight percentage.

TABLE 4

Formulations of a bio-based and a commercial carboxyl functional polyester

| Type | Code | A (wt. %) | B (wt. %) |
|---|---|---|---|
| COOH func. Bio-based polyester | Example 3 product | | 93.2 |
| COOH func Commercial polyester | FINE-CLAD M8930 ® | 93.2 | |
| Cross linker | PRIMID XL 552 ® | 4.9 | 4.9 |
| de-gas additive | Benzoin | 1.3 | 1.3 |
| flow promoter | MODAFLOW 6000 | 0.6 | 0.6 |

TABLE 4-continued

Formulations of a bio-based and a commercial carboxyl functional polyester

| Type | Code | A (wt. %) | B (wt. %) |
|---|---|---|---|
| | | $T_g$ (° C.) | Acid Value |
| | Example 3 product | 67 | 36.3 |
| | FINE-CLAD M8930 ® | 65 | 35 |

FINE-CLAD M8930® is an example of a polyester acid used for comparison purposes

Procedure: Powder Coating Mix Protocol (99° C. Mix in a Brabender® Mixer):

First a total formulation weight was calculated based on 120 ml bowl size; or about 70 grams total formulation weight. The Brabender® mixer was preheated to 99° C. (bowl rose to about 99° C.). About 30 minutes were allowed for preheating. When preheating was complete, the mixing blades were started and the torque sensor was turned on. This acted as a guide for how the mix was proceeding, then 30 g of primary resin were slowly added to the bowl and mixed until melted; then the remaining 35.2 g of primary resin was to added. The resin was allowed to mix and melt until the torque sensor showed a steady value (about 5 minutes). Then 1.3 g of additives (0.9 g of benzoin and 0.4 g of Modaflow 6000®) were added to center of mix zone between rotors;

Mixing continued for 10 minutes, (the torque value was monitored for stability); then 3.4 g of the crosslinking resin (Primid XL-552®) was added to the previous mixture; mixing continued for at least 3 minutes, the torque reading was monitored to make sure it remained stable in case crosslinking started) (torque reading will start to rise rapidly); the torque reading was monitored closely. The torque increased and the batch was stopped after a 10% rise in viscosity (torque).

The product was removed from the mixing bowl as a smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto 4 inch×6 inch bare steel panels using a Versa-Spray® manual spray gun supplied by Nordson Corporation. The panels were cured for 30 minutes at either 121° C. or 147° C. for 30 minutes (see Table 6 for test results).

The above procedure was repeated to obtain the control material.

The bio-based coating was far more robust in terms of gloss at varying temperatures, having equivalent gloss at the lower temperature and had a far better gloss at higher temperature.

Differential Scanning Calorimetry (DSC) results showed that the experimental resin did not affect the cure temperature, the magnitude of the cure, or the coating's final $T_g$ in either a positive or negative sense. This was consistent with the insensitivity of β-hydroxy amide cure rates to external influence (see Howell reference).

TABLE 5

Cure thermodynamics of hybrid coatings compounded from inventive versus commercial control resin

| DSC Results | Tg (° C.) | T onset (tangent) (° C.) | T peak of cure (° C.) | Delta H |
|---|---|---|---|---|
| A - commercial control | 76.2 | 123.9 | 127.8 | 4.897 J/g |
| B - Bio-based (Example 1) | 75.7 | 122.6 | 128 | 5.203 J/g |

The bio-based coating also had final properties that were similar to the commercial control at both curing temperatures:

TABLE 6

Film properties of test formulations

| Test formulation | Cure Temperature (° C.) | Pencil Hardness | MEK Double rubs | Crosshatch adhesion (% Loss) | Blush | One week humidity storage (100% humidity, 32° C.) Crosshatch adhesion (% Loss) |
|---|---|---|---|---|---|---|
| A-1 (comp) | 121 | HB | 10 | 50 | yes | 50 |
| B-1 (bio) | 121 | B | 10 | 50 | yes | 50 |
| A-2 (comp) | 147 | 3H | 45 | 100 | no | 100 |
| B-2 (bio) | 147 | 3H | 20 | 100 | no | 100 |

The data in Tables 5 and 6 shows that both coatings are essentially equivalent in overall performance. The bio-based coating had a slight advantage in gloss at higher cure temperature, and the commercial control had a small advantage in solvent resistance. As previously stated, the gloss at higher temperature may be a significant advantage in formulations requiring great temperature robustness.

Thus, bio-based resins of this type are useful as transesterification crosslinking reactions with β-hydroxy alkylamides.

EXAMPLE 4A

This example illustrates the preparation of a powder coating formulation using carboxyl functional resins with β-hydroxy amide type crosslinking.

A carboxylic functional polyester (Example 3E) was compared to a commercial polyester in a side-by-side comparison of a typical powder coating formulation compounded as described above and crosslinked by β-hydroxy amide transesterification. Table 4A below shows these formulations as a weight percentage.

TABLE 4A

Formulations of a bio-based and a commercial carboxyl functional polyester

| Type of Material | Specific Material | A (wt. %) | B (wt. %) |
|---|---|---|---|
| COOH func. Bio-based polyester | Example 3E product | 91 | |
| COOH func. Commercial polyester | FINE-CLAD M8930 ® | | 91 |
| cross linker | PRIMID XL 552 ® | 4.8 | 4.8 |
| de-gas additive | Benzoin | 1.3 | 1.3 |
| flow promoter | Fine Clad A241 ® | 2.9 | 2.9 |

| | Tg (° C.) | Acid Value |
|---|---|---|
| Example 3E product | 72.3 | 32.8 |
| FINE-CLAD M8930 ® | 65 | 35 |

First a total formulation weight was calculated based on a 120 ml bowl size; or about 85 g total formulation weight. The Brabender® mixer was preheated to 99° C. (bowl rose to about 99° C.). About 30 minutes were allowed for preheating. When preheating was complete, the mixing blades were started and the torque sensor was turned on. This acted as a guide for how the mix was proceeding; then 30 g of primary resin were slowly added to the bowl and mixed until melted; then the remaining 37.8 g of primary resin was added. The resin was allowed to mix and melt until the torque sensor showed a steady value (about 5 minutes); then 3.6 g of additives (1.1 g of Benzoin and 2.5 g of Fine Clad A241®) were added to center of mix zone between rotors; mixing continued for 10 minutes, (the torque value was monitored for stability); then 4.1 g of the crosslinking resin (Primid XL-552®) was added to the previous mixture; mixing continued for at least 3 minutes, the torque reading was monitored to make sure it remained stable in case crosslinking started) (torque reading will start to rise rapidly); the torque reading was monitored closely. The torque increased and the batch was stopped after a 10% rise in viscosity (torque). The product was removed from the mixing bowl as a smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation. The panels were cured for 30 minutes at either 121° C. or 147° C. for 30 minutes (see Table 6 for test results). The above procedure for Example 4A was repeated to obtain the control material.

The bio-based coating was far more robust in terms of gloss at varying temperatures, having equivalent gloss at the lower temperature and had a far better gloss at higher temperature.

Differential Scanning Calorimetry (DSC) results showed that the experimental coating did not affect the cure temperature, the magnitude of the cure, or the coating's final $T_g$ in either a positive or negative sense. This was consistent with the insensitivity of β-hydroxy amide cure rates to external influence (see Howell reference).

TABLE 5A

Cure thermodynamics of hybrid coatings compounded from inventive versus commercial control resin

| DSC Results | Tg (° C.) | T onset (tangent) (° C.) | T peak of cure (° C.) | Delta H |
|---|---|---|---|---|
| 4A-A Control | 72.8 | About 110 | 117.2 | 5.029 J/g |
| 4A-B Bio-based (Example 3E product) | 72.4 | 113.0 | 119.5 | 4.164 J/g |

The bio-based coating also had final properties that were similar to the commercial control at both curing temperatures as seen in Table 6A below.

TABLE 6A

Film properties of test formulations

| Test formulation | Cure Temperature (° C.) | Pencil Hardness (#) | MEK Double rubs | Crosshatch adhesion (% Loss) | 60° Gloss |
|---|---|---|---|---|---|
| 4A-A-1 con | 121 | HB | 10 | 100 | 95.8 |
| 4A-B-1 bio | 121 | 3H | 5 | 10 | 93.4 |
| 4A-A-2 con | 147 | 3H | 80 | 0 | 59.3 |
| 4A-B-2 bio | 147 | 4H | 14 | 0 | 97.0 |

The data in Tables 5A and 6A show that both coatings are essentially equivalent in overall performance. The bio-based had the advantage of a harder film at the lower cure temperature—#H pencil versus #HB pencil. The to bio-based also had an advantage in gloss at higher cure temperature, and the commercial control had a advantage in solvent resistance. As previously stated, the gloss at higher temperature may be a significant advantage in formulations requiring great temperature robustness.

Thus, bio-based resins of this type are useful as transesterification crosslinking reactions with β-hydroxy alkylamides.

EXAMPLE 5

This example illustrates the preparation of formulation for a hybrid coating formulated with a carboxyl functional polyester resin (product from Example 2) and an acrylic epoxy cross linker.
Procedure: Powder Coating Mix Protocol for Bio-based Hybrid Powder Coating (99° C. mix in Brabender® mixer):

First a total formulation weight was calculated based on 120 ml bowl size; or approximately 70 g of total formulation weight. The Brabender® mixer was preheated to 99° C. (bowl rose to about 99° C.). About 30 minutes were allowed for preheating. When preheating was complete, the mixing blades were started and the torque sensor was turned on. This acted as a guide for how the mix was proceeding. Then 30 g of primary resin (resin described in Example 2) were slowly added to the bowl and mixed until melted; the remaining 21.5 g of primary resin was added. The resin was allowed to mix and melt until the torque sensor showed a steady value (about 5 minutes); Mixing continued for 10 minutes, (the torque value was monitored for stability); 16.9 g of crosslinking resin (Fine Clad A229-30A®) was added to the previous mixture; mixing continued for at least 3 minutes, the torque reading was monitored to make sure it remained stable in case crosslinking started) (torque reading will start to rise rapidly); the torque reading was monitored closely. The catalyst was ground to a fine powder and was added last (0.4 g of imidazole and 1.1 g of dodecanedioic acid). The torque increased and the batch was stopped after a 10% rise in viscosity (torque).

The product was removed from the mixing bowl as a smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to approximately 2.5 mils dry film thickness. The panels were cured for 30 minutes at 121° C. for 30 minutes.
Procedure: Powder Coating Mix Protocol for Control Polyester Hybrid Powder Coating (99° C. Mix in Brabender® Mixer):

First a total formulation weight was calculated based on 120 ml bowl size; or approximately 70 g of total formulation weight. The Brabender® mixer was preheated to 99° C. (bowl rose to about 99° C.). 30 minutes were allowed for preheating.

When preheating was complete, the mixing blades were started and the torque sensor was turned on. This acted as a guide for how the mix was proceeding; then 30 g of primary resin (Fine-Clad M8400®) were slowly added to the bowl and mixed until melted; the remaining 25.8 g of primary resin was added. The resin was allowed to mix and melt until the torque sensor showed a steady value (about 5 minutes); mixing continued for 10 minutes, (the torque value was monitored for stability); 12.7 g of crosslinking resin (Fine Clad A229-30A®) was added to the previous mixture; mixing continued for at least 3 minutes, the torque reading was monitored to make sure it remained stable in case crosslinking started) (torque reading will start to rise rapidly); the torque reading was monitored closely. The catalyst (0.4 g of imidazole and 1.1 g of dodecanedioic acid) was added last, watching the torque reading closely. The torque increased and the batch was stopped after a 10% rise in viscosity (torque).

The product was removed from the mixing bowl as a smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to approximately 2.5 mils dry film thickness. The panels were cured for 30 minutes at 121° C. for 30 minutes.

Figure 4:
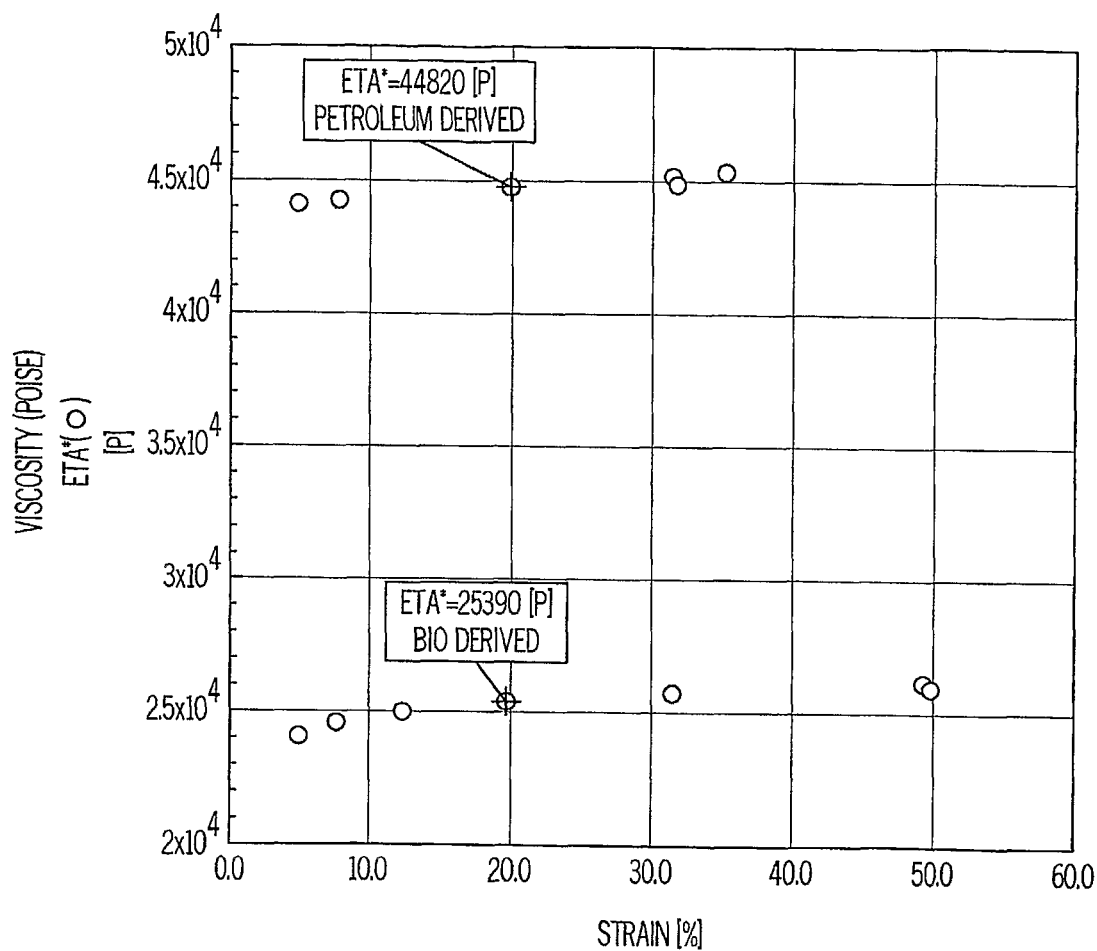
FIG. 4 is a graph that illustrates rheology curves for a bio-based resin (Example 2) and a typical commercial resin (FINE-CLAD 8400®).

The two polyester resins described in this example have viscosities which were described in FIG. 4 were formulated into clear coats per these procedures and are shown below in Table 7. Table 7 shows the amounts of various ingredients in weight percentages.

TABLE 7

Formulations of a bio-based and a commercial carboxyl functional polyester

| Type of Material | Specific Material | A (wt. %) | B (wt. %) |
|---|---|---|---|
| COOH func. Bio-based polyester | Example 2 product | | 73.6 |
| COOH func Control polyester | FINE-CLAD M8400 ® | 79.7 | |
| Epoxy Crosslinker | FINE-CLAD A229-30A ® | 18.1 | 24.2 |
| Catalyst | Imidazole | 0.6 | 0.6 |
| Cure modifier | Dodecanedioic acid | 1.6 | 1.6 |

A comparison was made of the effect of cure on appearance, for the bio-based material and a control system. A low cure temperature powder coating was selected as control. The product tested is designated 1PC-306-0040 (F-0040) S-9 Clear Gloss®. The cure schedule was 15 minutes at 145° C. or 10 minutes at 162° C.

Surface roughness of the coatings was quantified by a profilometer. During this test a thin needle passed over the surface of the coating while the peaks and valleys of the surface were recorded. The valleys were recorded as $R_v$ (nm) and the peaks were recorded as $R_p$ (nm). An average roughness ($R_a$) is calculated from these two values. Lower R values indicate a surface that is more level or smooth. See Table 8 for the R values for the coated panels.

TABLE 8

Surface Roughness

| | $R_a$ Value (μm) | $R_v$ Value (μm) | $R_p$ Value (μm) |
|---|---|---|---|
| Bio-based | 1.34 | 5.11 | 4.04 |
| Petroleum-derived control | 4.22 | 12.62 | 15.70 |

Typical R values for surface roughness produced by common productions methods (as listed in ASME B46.1-1995) can be compared to the values in Table 8. The surface roughness of the bio-based panel is similar to the surfaces produced by grinding, honing and electro-polishing. The surface roughness of the control panel is similar to the surfaces produced by snagging, planing and shaping operations.

EXAMPLE 6

This example illustrates a pigmented hybrid powder coating formulated from with a bio-based carboxyl functional polyester of Example 3A and an epoxy crosslinker.

Pigmented powder coatings may also benefit if the bio-based resin has superior ability to disperse and develop the color of the pigment. An example of a black powder coating formulation (below), was made up versus a commercial control, see Table 9. The formulations in Table 9 show the amounts of various ingredients based on a weight percentage.

TABLE 9

Formulations of bio-based and commercial carboxyl functional polyester black powder coatings

| Type of Material | Specific Ingredient | A (wt. %) | B wt. % |
|---|---|---|---|
| COOH func. Bio-based polyester | (Example 3A product) | | 75.9 |
| COOH functional Control polyester | FINE-CLAD M8400 ® | 74.2 | |
| Epoxy functional Control acrylic | FINE-CLAD A257 ® | 17.9 | 16.2 |
| Carbon black pigment | Black 1300 ® (Cabot) | 1.1 | 1.1 |
| De-gas additive | Benzoin | 1.3 | 1.3 |
| Catalyst | Imidazole | 0.7 | 0.7 |
| Diacid cure modifier | Dodecanedioic acid | 2.4 | 2.4 |
| Acidic cure modifier | NACURE 7231 ® | 2.4 | 2.4 |

First a total formulation weight was calculated based on 120 ml bowl size; or about 70 g total formulation weight. The Brabender® mixer was preheated to 99° C. (bowl rose to about 99° C.). 30 minutes were allowed for preheating.

When preheating was complete, the mixing blades were started and the torque sensor was turned on. This acted as a guide for how the mix was proceeding; then 30 g of primary resin (as described in Example 3A) were slowly added to the bowl; allowed to mix until melted and the remaining 23.1 g of resin was added. The resin was allowed to mix and melt until the torque sensor showed a steady value (about 5 minutes); 1.7 g of additives (0.8 g of black pigment and 0.9 g of benzoin) were added to center of mix zone between rotors;

Mixing continued for 10 minutes, (the torque value was monitored for stability);

The 11.3 g of crosslinking resin, an acrylic with epoxy functional groups, (FineClad A257®) was added to the previous mixture; mixing continued for at least 3 minutes, the torque reading was monitored to make sure it remained stable in case crosslinking started) (torque reading will start to rise rapidly); the torque reading was monitored closely. The catalyst was ground to a fine powder and added last (0.5 g of imidazole, 1.7 g of dodecanedioic acid and 1.7 g of Nacure XC-7231®). The torque increased and the batch was stopped after a 10% rise in viscosity (torque).

The product was removed from the mixing bowl as a black smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 121° C. for 30 minutes.

For the control polyester pigmented powder coating, a total formulation weight was calculated based on 120 ml bowl size; or about 70 g total formulation weight. The Brabender® mixer was preheated to 99° C. (bowl rose to about 99° C.). About 30 minutes were allowed for preheating.

When preheating was complete, the mixing blades were started and the torque sensor was turned on. This acted as a guide for how the mix was proceeding; then 30 g of primary resin (Fine-Clad M8400®) were slowly added to the bowl; allowed to mix until melted and the remaining 21.9 g of resin was added. The resin was allowed to mix and melt until the torque sensor showed a steady value (about 5 minutes); 1.7 g of additives (0.8 g of Black pigment and 0.9 g of benzoin) were added to center of mix zone between rotors. Mixing continued for 10 minutes, (the torque value was monitored for stability). The 12.5 g of crosslinking resin (FineClad A257®) was added to the previous mixture; mixing continued for at least 3 minutes, the torque reading was monitored to make sure it remained stable in case crosslinking started) (torque reading will start to rise rapidly); the torque reading was monitored closely. The catalyst (0.5 g of imidazole, 1.7 g of dodecanedioic acid and 1.7 g of Nacure XC-7231®) was added last, watching the torque reading closely. The torque increased and the batch was stopped after a 10% rise in viscosity (torque).

The product was removed from the mixing bowl as a black smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 121° C. for 30 minutes.

The bio-based powder coating had a much higher 60° gloss than the petrochemical-derived coating (85 points versus 44 points). This was likely due to the better melt-flow of the formulation during thermal cure.

The color development/jetness of the black pigment is improved with the bio-based formulation. Jetness can be determined by measuring the L and b color components of the coating. (For an explanation of the Hunter color Scale see Wicks, Z. W. et al. cited above).

Extreme black is determined by low L values and deep blue undertones are determined by low b values. The lower the L and b values, the more jet the coating. The jetness is improved with better pigment dispersion and color development. Table 10 below shows the color measurements from the coated panels:

TABLE 10

Color Data

| Test Panel | L value | b value |
|---|---|---|
| Bio-based | 24.53 | −0.38 |
| Petroleum-derived | 25.06 | −0.27 |

The overall Delta E, or color difference for the two black panels is 0.52. The petroleum derived panel appears greyer than that of the bio-based formulation because the black pigment was not dispersed as well into the coating system as the bio-based formulation.

EXAMPLE 6A

In addition to the need for low temperature flow and cure in powder coatings, there is also a need for good dispersion of pigments within a coating matrix, regardless of the coating type. To accomplish this, polymers are designed that have components with differing compatibilities. Polymeric dispersants stabilize pigments and other ingredients in paints, coatings, and ink systems via, most typically, steric stabilization. Polymeric dispersants have a two-component structure comprised of anchoring groups and polymeric chains. Most typically the anchoring groups are polar materials that interact with the particle surfaces and the polymeric chains which are compatible with the continuous phase of the coating. In effect, the polymeric groups form a coating around the particles, preventing them from making contact and agglomerating into larger, incompatible aggregates.

There are many anchoring group/polymer configurations that might be expected to give effective polymeric dispersants. The inventive resin has polar carboxylic anchoring sites and non-polar vegetable oil chains and can therefore act as a dispersant as well as a binder. A curing binder that can also act as a dispersant could eliminate the need for separate additives for dispersing many pigments.

The formulations in Table 10-6A-1 show the amounts of various ingredients based on a weight percentage.

TABLE 10-6A-1

Formulations of carbon black pigment dispersed with bio-based and commercial carboxyl functional polyester

| Type of Material | Specific Ingredient | A (wt. %) | B (wt. %) |
|---|---|---|---|
| COOH func. Bio-based polyester | (Example 3A product) | 90.0 | |
| COOH func Control polyester | FINE-CLAD M8400 ® | | 90.0 |
| Carbon black pigment | Black 1300 ® (Cabot) | 10.0 | 10.0 |

First a total formulation weight was calculated based on 120 ml bowl size; or about 70 g total formulation weight. The Brabender® mixer was preheated to 110° C. (bowl rose to about 110° C.). 30 minutes were allowed for preheating.

When preheating was complete, the mixing blades were started and the torque sensor was turned on. This acted as a guide for how the mix was proceeding; then 30.0 g of primary resin (as described in Example 3) were slowly added to the bowl; allowed to mix until melted and the remaining 33.0 g of resin was added. The resin was allowed to mix and melt until the torque sensor showed a steady value (about 5 minutes); the speed of the mixing blades was set to 40 revolutions per minute; 7.0 g of black pigment were added to center of mix zone between rotors; Mixing continued for 15 minutes. The product was removed from the mixing bowl as a black smooth, firm, shiny material and allowed to cool to room temperature. The material was broken into small chips with a hammer.

For the control polyester black dispersion, a total formulation weight was calculated based on 120 ml bowl size; or about 70 g total formulation weight. The Brabender® mixer was preheated to 110° C. (bowl rose to about 110° C.). 30 minutes were allowed for preheating.

When preheating was complete, the mixing blades were started and the torque sensor was turned on. This acted as a guide for how the mix was proceeding; then 30.0 g of control polyester (FineClad M8400) were slowly added to the bowl; allowed to mix until melted and the remaining 33.0 g of resin was added. The resin was allowed to mix and melt until the torque sensor showed a steady value (about 5 minutes); the speed of the mixing blades was set to 40 revolutions per minute; 7.0 g of black pigment were added to center of mix zone between rotors; Mixing continued for 15 minutes. The product was removed from the mixing bowl as a black smooth, firm, shiny material and allowed to cool to room temperature. The material was broken into small chips with a hammer.

These materials were used in subsequent formulations to determine the degree of dispersement of the carbon black pigment. The more dispersed the black pigment is, the darker (blacker) the resulting color of the final formulation.

The formulations in Table 10-6A-2 show the amounts of various ingredients based on a weight percentage.

TABLE 10-6A-2

Formulations of bio-based and commercial carboxyl functional polyester grey powder coatings

| Type of Material | Specific Ingredient | A (wt. %) | B (wt. %) |
|---|---|---|---|
| COOH func polyester | FINE-CLAD M8400 ® | 49.8 | 49.8 |
| Titanium Dioxide pigment | Kronos CR2310 (Kronos Titan GmbH)) | 30.0 | 30.0 |
| Dispersed black pigment in biobased polyester | Example A from table above | 5.0 | |
| Dispersed black pigment in bio-control polyester | Example B from table above | | 5.0 |
| Epoxy func acrylic | FINE-CLAD A257 ® | 10.2 | 10.2 |
| De-gas additive | Benzoin | 1.5 | 1.5 |
| Catalyst | Imidazole | 0.7 | 0.7 |
| Diacid cure modifier | Dodecanedioic acid | 2.7 | 2.7 |

First a total formulation weight was calculated based on 120 ml bowl size; or about 70 g total formulation weight. The Brabender® mixer was preheated to 99° C. (bowl rose to about 99° C.). 30 minutes were allowed for preheating.

When preheating was complete, the mixing blades were started and the torque sensor was turned on. This acted as a guide for how the mix was proceeding; then 34.9 g of primary resin (FINE-CLAD M8400®) were slowly added to the bowl; allowed to mix until melted. The resin was allowed to mix and melt until the torque sensor showed a steady value (about 5 minutes); 22.1 g of additives (21.0 g of white pigment (Kronos 2310) and 1.1 g of benzoin) were added to center of mix zone between rotors; the speed of the rotors was set to 60 revolutions per minute and mixing continued for 15 minutes; 3.5 g of black pigment previously dispersed in bio-based polyester resin (Example A from Table 10-6A-2) was added and the speed of the rotors was decreased to 40 revolutions per minute; mixing continued for 5 minutes. The 7.2 g of crosslinking resin (FineClad A257®) was added to the previous mixture; mixing continued for at least 2 minutes, the torque reading was monitored to make sure it remained stable in case crosslinking started) (torque reading will start to rise rapidly); the torque reading was monitored closely. The catalyst was ground to a fine powder and added last (0.5 g of imidazole and 1.9 g of dodecanedioic acid). Mixing continued for 2 minutes.

The product was removed from the mixing bowl as a grey smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 121° C. for 30 minutes.

The control polyester powder coating total formulation weight was calculated based on 120 ml bowl size; or about 70 g total formulation weight. The Brabender® mixer was preheated to 99° C. (bowl rose to about 99° C.). 30 minutes were allowed for preheating.

When preheating was complete, the mixing blades were started and the torque sensor was turned on. This acted as a guide for how the mix was proceeding; then 34.9 g of primary resin (FineClad M8400) were slowly added to the bowl; allowed to mix until melted. The resin was allowed to mix and melt until the torque sensor showed a steady value (about 5 minutes); 22.1 g of additives (21.0 g of white pigment (Kronos 2310) and 1.1 g of benzoin) were added to center of mix zone between rotors; the speed of the rotors was set to 60 revolutions per minute and mixing continued for 15 minutes; 3.5 g of black pigment previously dispersed in bio-based polyester resin (Example B from Table 10-6a-2) was added and the speed of the rotors was decreased to 40 revolutions per minute; mixing continued for 5 minutes. The 7.2 g of crosslinking resin (FineClad A257®) was added to the previous mixture; mixing continued for at least 2 minutes, the torque reading was monitored to make sure it remained stable in case crosslinking started) (torque reading will start to rise rapidly); the torque reading was monitored closely. The catalyst was ground to a fine powder and added last (0.5 g of imidazole and 1.9 g of dodecanedioic acid). Mixing continued for 2 minutes.

The product was removed from the mixing bowl as a grey smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 121° C. for 30 minutes.

The color development and tint strength of the black pigment is improved with the bio-based formulation. Tint strength is the ability of the carbon black to darken/influence a formulation with other pigments present; such as titanium dioxide. Tint strength can be determined by measuring the L and b color components of the coating. (For an explanation of the Hunter color Scale see Wicks, Z. W. et al. cited above).

Higher tint strength is determined by low L values. The lower the L values, the more dispersed the carbon black and the color is better developed in the coating. The bio based polyester is better able to disperse and more fully develop the color of the carbon black to result in a higher tint strength. Table 10-6A-3 below shows the color measurements from the coated panels:

TABLE 10-6A-3

Color Data

| Test Panel | L value |
|---|---|
| Bio-based | 59.36 |
| Petroleum-derived | 61.83 |

The overall Delta E, or color difference for the two black panels is 2.53. The petroleum derived panel appears lighter than that of the bio-based formulation because the black pigment was not dispersed as well into the coating system as the bio-based formulation.

EXAMPLE 6B

This example illustrates a pigmented hybrid powder coating formulated from with a bio-based carboxyl functional polyester of Example 3A and a triglycidyl isocyanurate (TGIC) crosslinker.

Powder coatings may also benefit if the bio-based resin has superior ability to promote the flow and leveling of the coating without the appearance if fisheyes or film defects. An example of a white powder coating formulation (below), was made up versus a commercial control, see Table 10-6B-1. The formulations in Table 10-6B-1 show the amounts of various ingredients based on a weight percentage.

TABLE 10-6B-1

Formulations of bio-based and commercial carboxyl functional polyester white powder coatings

| Type of Material | Specific Ingredient | A (wt. %) | B (wt. %) |
|---|---|---|---|
| COOH func. Bio-based polyester | (Example 3A product) | 57.2 | |
| COOH func Control polyester | Albester 5140 (Hexion) | | 57.2 |
| TGIC crosslinker | triglycidyl isocyanurate | 4.4 | 4.4 |
| Titanium dioxide white pigment | Kronos CR2310 (Kronos Titan GmbH)) | 37.9 | 37.9 |
| De-gas additive | Benzoin | 0.5 | 0.5 |

First a total formulation weight was calculated based on 120 ml bowl size; or about 70 g total formulation weight. The Brabender® mixer was preheated to 110° C. (bowl rose to about 110° C.). 30 minutes were allowed for preheating.

When preheating was complete, the mixing blades were started and the torque sensor was turned on. This acted as a guide for how the mix was proceeding; then 30 g of primary resin (as described in Example 3) were slowly added to the bowl; allowed to mix until melted and the remaining 27.2 g of resin was added. The resin was allowed to mix and melt until the torque sensor showed a steady value (about 5 minutes); 42.8 g of additives (4.4 g of TGIC, 37.9 g of titanium dioxide (Kronos CR2310) and 0.5 g of benzoin) were added to center of mix zone between rotors;

Mixing continued for 10 minutes, (the torque value was monitored for stability);

The product was removed from the mixing bowl as a white smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 121° C.

For the control polyester pigmented powder coating, a total formulation weight was calculated based on 120 ml bowl size; or about 70 g total formulation weight. The Brabender® mixer was preheated to 110 C. (bowl rose to about 110° C.). About 30 minutes were allowed for preheating.

When preheating was complete, the mixing blades were started and the torque sensor was turned on. This acted as a guide for how the mix was proceeding; then 30 g of primary resin (Albester 5140) were slowly added to the bowl; allowed to mix until melted and the remaining 27.2 g of resin was added. The resin was allowed to mix and melt until the torque sensor showed a steady value (about 5 minutes); 42.8 g of additives (4.4 g of TGIC, 37.9 g of titanium dioxide (Kronos CR2310) and 0.5 g of benzoin) were added to center of mix zone between rotors; Mixing continued for 10 minutes, (the torque value was monitored for stability).

The product was removed from the mixing bowl as a white smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 121° C.

TABLE 10-6B-2

Physical Properties of white powder coatings

| | Solvent Rubs (90/10 Toluene/MEK double rubs) ASTM D5402-93 | Solvent Rubs (MEK double rubs) ASTM D5402-93 | 60° Gloss ASTM D523-89 | Pencil Hardness ASTM D3363-00 | Crosshatch Adhesion ASTM D3359-02 | Appearance Fisheyes (yes or no) |
|---|---|---|---|---|---|---|
| Bio-Based Formulation | 100+ | 150 | 84.5 | 3H | 5B | No |
| Control Formulation | 90 | 81 | 80.3 | 2H | 5B | yes |

The bio-based formulation has better solvent resistance, higher gloss and higher pencil hardness than the control formulation. The overall appearance of the bio-based formulation is much better than the control formulation that has film defects known as "fisheyes". The presence of fisheyes in a coating is not only just an appearance problem, but since the substrate is exposed to the environment, these areas are susceptible to rust and corrosion.

The resin according to another embodiment of the invention can be used as an additive pigment to more efficiently disperse the pigment. For example the pigment can be added to aid in color development.

EXAMPLE 7

This example illustrates the production of a hybrid powder coating formulated with an amido-amine functional polyester and an epoxy crosslinker.

Amido-amine functional polyester powder coatings may also be formulated with the bio-based resin. An example of a powder coating formulation is shown below in Table 11 where the ingredient amounts are shown as weight percentages. As there were no commercially available amido-amine functional polyester resins available, therefore no control was used.

TABLE 11

Powder Coating Formulations

| Type of Material | Specific Material | Amount (wt %) |
|---|---|---|
| Amido-amine func. bio-based polyester | Sample No. 36-24* | 48.2 |
| Epoxy functional crosslinker | FINE-CLAD A249A ® | 43.7 |
| Catalyst | Imidazole | 1.0 |
| Diacid cure modifier | Dodecanedioic acid | 3.0 |
| Acidic cure modifier | Nacure XC7231 ® | 3.0 |
| Flow promoter | Modaflow 6000 ® | 1.0 |

*Amido-amine functional resins as disclosed in WO 2004/077169, for Readily Deinkable Toners, filed Feb. 2, 2004, and designating the United States, the entire disclosure of which is incorporated herein by reference. Resin Sample No. 36-24 had a Tg of 72.5° C. and an approximate viscosity of $1.6 \times 10^2$ Poise.

First a total formulation weight was calculated based on 120 ml bowl size; or about 70 g of total powder coatings. The Brabender® mixer was preheated to 99° C. (bowl rose to about 99° C.). About 30 minutes were allowed for preheating. When preheating was complete, the mixing blades were started and the torque sensor was turned on. This acted as a guide for how the mix was proceeding; then 30 g of primary resin (49251-23-22) were slowly added to the bowl. The resin was allowed to mix and melt until the torque sensor showed a steady value (about 5 minutes); then the remaining 3.7 g of primary resin was added and allowed to mix for approximately 5 minutes.

Then 0.7 g of additives (Modaflow 6000®) was added to center of mix zone between rotors. Mixing continued for 10 minutes, (the torque value was monitored for stability). Then 30.6 g of the crosslinking resin (FineClad A249A®) was added to the previous mixture; mixing continued for at least 3 minutes, the torque reading was monitored to make sure it remained stable in case crosslinking started) (torque reading will start to rise rapidly); the torque reading was monitored closely. The catalyst (0.7 g of imidazole, 2.1 g of dodecanedioic acid and 2.1 g of Nacure XC-7231®) was added last, watching the torque reading closely. The torque increased and the batch was stopped after a 10% rise in viscosity (torque).

The product was removed from the mixing bowl as a smooth, firm, shiny material and allowed to cool to room temperature. The material was broken into small chips with a hammer. Finally the product was micronized in a ball mill in the presence of 10 mm-15 mm steel media for 16 hours. A final powder was obtained and sieved to remove any particles over 150 microns.

The powder was electrostatically sprayed onto a 10.16 cm×15.24 cm (4 inch×6 inch) bare steel panels using a Versa-Spray® manual spray gun supplied by Nordson Corporation to a film build of approximately 76.2 microns (3 mils) dry film thickness. The panels were cured in a convection oven for 30 minutes at 95° C., 107° C. or 121° C. for 30 minutes (see Table 13 for test results).

A sample from Example 7 was analyzed with the DSC, results shown in Table 12 below.

TABLE 12

Cure thermodynamics of hybrid coatings compounded from bio-based amido-amine functional polyester

| DSC Results | Tg (° C.) | T onset (tangent) (° C.) | T peak of cure (° C.) | Delta H |
|---|---|---|---|---|
| Bio-based (Example 7) | 78.7 | 123 | 176.2 | 49.1 J/g |

Although none of the panels had very high gloss, the film properties were reasonable at 107° C. cure temperature, see Table 13. The hardness improved dramatically as well as the solvent resistance (MEK double rubs). The Mandrel bend results also showed improved adhesion and flexibility.

TABLE 13

Film properties of test formulations

| Test formulation | Cure Temperature (° C.) | Pencil Hardness (#) | MEK double Rubs | Crosshatch Adhesion (% loss) | Forward Impact | 3.18 mm (⅛ inch) Mandrel Bend |
|---|---|---|---|---|---|---|
| Example 7 | 95 | 3B | 2 | 0 | 120 inch lbs | 100 mm failure |
| Example 7 | 107 | 3H | 30 | 0 | 160 inch lbs | 0 mm failure |
| Example 7 | 121 | 4H | 80 | 0 | 160 inch lbs | 0 mm failure |

EXAMPLE 8

This example illustrates the production of a powder coating using a bio-based polyester as a flow promoter. The polyester polymer is described in EXAMPLE 3B.

First a control formulation was prepared as follows:

First a total formulation weight was calculated based on 120 ml bowl size; or about 70 g of total powder coatings. The Brabender® mixer was preheated to 93° C. (bowl rose to about 99° C.). About 30 minutes were allowed for preheating. When preheating was complete, the mixing blades were started and the torque sensor was turned on. This acted as a guide for how the mix was proceeding. Then 30 g of primary resin (Fine-Clad M8710®) were slowly added to the bowl; the resin was allowed to mix and melt until the torque sensor showed a steady value (about 5 minutes); then the remaining 31.8 g of primary resin was added and allowed to mix and mix for approximately 5 minutes. Then 0.44 g of additives (benzoin) was added to center of mix zone between rotors. Mixing continued for 10 minutes, (the torque value was monitored for stability);

17.7 g of the crosslinking resin (FineClad A249A®) was added to the previous mixture; mixing continued for at least 3 minutes, the torque reading was monitored to make sure it remained stable in case crosslinking started) (torque reading will start to rise rapidly); the torque reading was monitored closely.

The product was removed from the mixing bowl as a smooth, firm, shiny material and allowed to cool to room temperature. The material was broken into small chips with a hammer.

The above procedure was repeated six more times to incorporate either 1% (on weight) or 3% (on weight) of each of three flow promoters. The flow promoters were added at the time of benzoin addition. A bio-based flow promoter (EXAMPLE 3B), and two commercially available flow promoters (Fine-Clad A241® and Additol VXL9820®) were used, see Table 14 below to prepare formulations B through G.

TABLE 14

Comparison of Polymeric Flow Controllers

| Type of Material | Specific Material | A wt % | B* wt % | C* wt % | D wt % | E wt % | F wt % | G wt % |
|---|---|---|---|---|---|---|---|---|
| Carboxy functional polyester | FINE-CLAD M8710 ® | 77.3 | 76.5 | 75 | 76.5 | 75 | 76.5 | 75 |
| Epoxy type Crosslinker | FINE-CLAD A249A ® | 22.1 | 21.9 | 21.5 | 21.9 | 21.5 | 21.9 | 21.5 |
| De-gas additive | Bezoin | 0.6 | 0.5 | 0.5 | 0.5 | 0.5 | 0.5 | 0.5 |
| Bio-based flow promoter | EXAMPLE 3B product |  | 1.0 | 3.0 |  |  |  |  |
| Flow Promoter | FINE-CLAD A241 ® |  |  |  | 1.0 | 3.0 |  |  |
| Flow promoter | Additol VXL9820 ® |  |  |  |  |  | 1.0 | 3.0 |

*inventive formulation

The viscosity of the formulations in Table 14 was tested in order to determine the effectiveness of the flow promoters in reducing the viscosity of powder coating at low cure temperatures. A lower viscosity would indicate a better flow out and smoother final film during the bake. Table 15 shows the viscosities in Poise at 90° C. to 140° C.

TABLE 15

Viscosity (Poise)

| Temperature (° C.) | A | B* | C* | D | E | F | G |
|---|---|---|---|---|---|---|---|
| 90 | 376200 | 317430 | 373860 | 384790 | 437350 | 430130 | 437530 |
| 100 | 168310 | 167340 | 172110 | 173270 | 199940 | 176650 | 198720 |
| 110 | 67853 | 76473 | 76455 | 69627 | 79496 | 69476 | 81240 |
| 120 | 33261 | 41264 | 38100 | 32224 | 38617 | 34479 | 37187 |
| 130 | 15742 | 22538 | 19801 | 14825 | 18524 | 16679 | 16757 |
| 140 | 10402 | 16724 | 14127 | 9835 | 12890 | 10888 | 10307 |

*Inventive formulation

Figure 7:
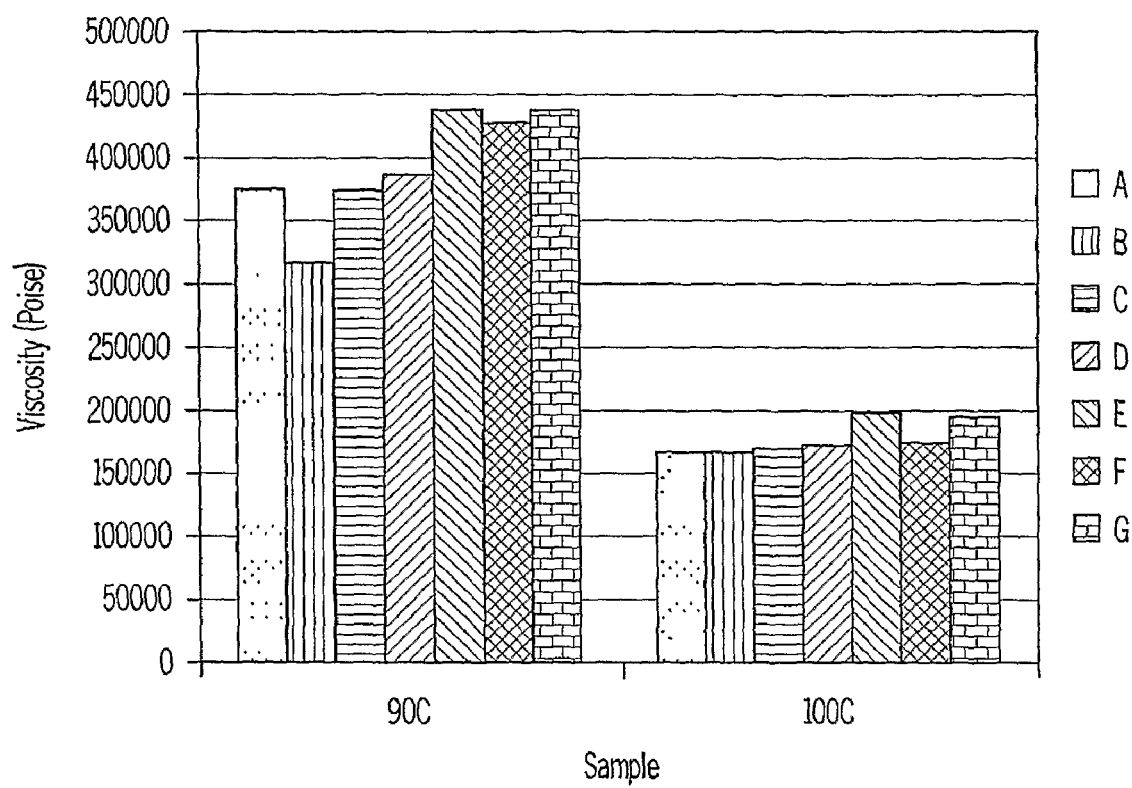
FIG. 7 is a bar graph showing the viscosities for formulations A to G of Example 8 at 90° C. and 100° C.

The 1% addition of the bio-based polyester flow promoter (sample B) is most effective in reducing the viscosity of the powder coating at the lower temperatures (90° C. and 100° C.) than the other tested flow promoters. The 3% addition at 90° C. (sample C) is still lower than the commercially available materials. This is illustrated graphically in FIG. 7.

The DSC results from this series show that even though the melt viscosity is reduced at 90° C. and 100° C. with the addition of the bio-based flow promoter, the $T_g$ of the entire powder coating formulation was not reduced and the powder stability is not compromised. The cure peak temperature and Reaction Enthalpy (Delta H) of the powder coating were not negatively influenced by the flow promoter. The results are shown in Table 16 for formulations A to G.

TABLE 16

DSC Results

| Property | A | B* | C* | D | E | F | G |
|---|---|---|---|---|---|---|---|
| $T_g$ (° C.) | 62.8 | 63 | 62.7 | 62.7 | 62 | 62.5 | 62.7 |
| Cure Peak (° C.) | 156.2 | 157.3 | 158 | 157.5 | 156.8 | 157.5 | 158 |
| Delta H (J/g) | −32.4 | −40.1 | −39.9 | −27.7 | −38.3 | −23.3 | −38.5 |

*Inventive formulation

EXAMPLE 9

The resin of Example 3F was evaluated for its pigment dispersion properties with color concentrates Materials:

Two color concentrate formulas were chosen. One was a 10% loaded PB 15:3(phthalo blue) in a polystyrene carrier resin and the other was a custom green in an acrylonitrile butadiene styrene copolymer (ABS) based carrier resin. The custom green consisted of a blend of organic and inorganic pigments and was about 18% loaded. Control samples were run with typical dispersants such as zinc stearate and a combination of zinc stearate and ethylene bistearamide dispersants and the samples were run with the dispersant aid from Example 3F.

Compounding:

Compounding was done in a co-rotating 18 mm diameter Leistritz twin screw extruder Testing:

Dispersion testing was done using filter tests and the pressure build up was reported in bar/gram of pigment. This is a quantitative test for dispersion and a lower value indicates better dispersion.

Table 17 shows the formulations used for tests and the results.

TABLE 17

| Formula number | Pigment | Carrier resin | Dispersion aids | Filter test value Bar/gm pigment |
|---|---|---|---|---|
| 6C-303295-05 | 10% PB 15:3 | polystyrene | Zinc stearate | 8.5 |
| 6C-303296-05 | 10% PB 15:3 | polystyrene | Example 3F | 4.5 |
| 9C-602331-05 | 18% blend | ABS | EBS and Zinc stearate | 0.82 |
| 9C-602332-05 | 18% blend | ABS | Example 3F | 0.55 |

PB = phtalo blue
ABS = acrylonitrile butadiene styrene copolymer
EBS = ethylene bistearamide The comparison with a commercial dispersant zinc stearate, and a mixture or EBS and zinc stearate showed good results. The results showed constant superior color development in two different polymer systems.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A carboxyl or hydroxyl functional polyester coating resin comprising:
   the reaction product of
   A. a dianhydrohexitol;
   B. a fatty dimer diol having aliphatic side chains;
   C. a cyclic diacid, cyclic diester, or cyclic diacid chloride that contributes rigidifying effects; and
   D. a catalyst;
   wherein the carboxyl or hydroxyl functional coating resin has a Tg between about 40° C. and 80° C.

2. The polyester resin according to claim 1, further comprising an optional diol that is not ethylene glycol.

3. The resin according to claim 1, comprising an optional diacid, diester, or diacid chloride.

4. The resin according to claim 1, wherein the dianhydrohexitol comprises an isosorbide.

5. The coating resin according to claim 1, wherein the coating resin has a Tg above about 50° C.

6. The polyester resin according to claim 1, wherein the resin has excess unsaturation that is available for a secondary curing mechanism.

7. A method for making a hydroxyl functional polyester coating resin comprising:
   a. selecting a tough, crystalline bio-based monomer of a dianhydrohexitol;
   b. co-reacting with a fatty dimer diol having aliphatic side chains; and a cyclic diacid, cyclic diester, or cyclic diacid chloride that contributes rigidifying effects; to form resins comprising:
   a Tg of greater than about 40° C. and less than about 80° C.

8. The method of claim 7 wherein the resins have excess unsaturation that is available for secondary curing mechanism.

9. The coating resin according to claim 7, wherein the coating resin has a Tg above about 50° C.

* * * * *